(12) United States Patent
Sakurai

(10) Patent No.: US 6,593,964 B1
(45) Date of Patent: Jul. 15, 2003

(54) IMAGE PICKUP APPARATUS WITH NON-DEBASED HUE AND LUMINANCE WHEN READING ALL PIXELS AND COLOR GENERATION PERFORMED BY SINGLE LINES WHEN READING SKIPPED LINES

(75) Inventor: Junzo Sakurai, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/161,260

(22) Filed: Sep. 28, 1998

(30) Foreign Application Priority Data

Sep. 30, 1997 (JP) .............................. 9-281076

(51) Int. Cl.[7] .......................... H04N 3/14; H04N 5/225
(52) U.S. Cl. .................... 348/279; 348/220.1; 348/237; 348/280; 382/167
(58) Field of Search .......................... 348/220.1, 221.1, 348/222.1, 223.1, 224.1, 229.1, 230.1, 272, 273, 279, 280, 234, 237; 358/518, 525, 482, 483; 382/162, 167, 299, 300; H04N 3/14, 5/225

(56) References Cited

U.S. PATENT DOCUMENTS

| | | | | |
|---|---|---|---|---|
| 4,437,112 A | * | 3/1984 | Tanaka | 348/279 |
| 5,136,370 A | * | 8/1992 | Chi | 348/279 |
| 5,631,703 A | * | 5/1997 | Hamilton | 348/273 |
| 5,828,406 A | * | 10/1998 | Parulski | 348/220.1 |
| 5,907,355 A | * | 5/1999 | Kotaki | 348/273 |
| 6,122,007 A | * | 9/2000 | Ishibashi | 348/231.6 |

* cited by examiner

Primary Examiner—Ngoc-Yen Vu
(74) Attorney, Agent, or Firm—Armstrong, Westerman & Hattori, LLP.

(57) ABSTRACT

A single-plate color solid-state image pickup apparatus constructed to prevent a color deviation, using as a color filter array, complementary color filters that are sequentially arranged in color filter columns in a horizontally repeating cycle of four pixels of first, second, third, and fourth, such that: first color-difference signals are obtained as modulated signals periodically in a certain number of pixels from "first+second" and "third+fourth" pixel columns; second color-difference signals are obtained as modulated signals periodically in the same pixel number as the first color-difference signals from "second+third" and "fourth+fifth" pixel columns; and the first and second color-difference signals obtained from the pixel columns of "third+fourth" and "fourth+fifth" are different in phase by 180 degrees from the first and second color-difference signals obtained from the pixel columns of "first+second" and "second+third".

8 Claims, 19 Drawing Sheets

FIG. 3A  PRIOR ART

| Wr11 | Gb12 | Wr13 | Gb14 |
|------|------|------|------|
| Gr21 | Wb22 | Gr23 | Wr24 |
| Gb31 | Wr32 | Gb33 | Wr34 |
| Wb41 | Gr42 | Wb43 | Gr44 |

CR

| Wr11 ⊖ Gb12 | Wr13 ⊖ Gb12 | Wr13 ⊖ Gb14 | Wr15 ⊖ Gb14 |
|---|---|---|---|
| ↑ INT ↓ | ↑ INT ↓ | ↑ INT ↓ | ↑ INT ↓ |
| Wr32 ⊖ Gb31 | Wr32 ⊖ Gb33 | Wr34 ⊖ Gb33 | Wr34 ⊖ Gb35 |
| ↑ INT ↓ | ↑ INT ↓ | ↑ INT ↓ | ↑ INT ↓ |

FIG. 3B  PRIOR ART

| 1 | 3 | 1 | 3 |
|---|---|---|---|
| 2 | 4 | 2 | 4 |
| 3 | 1 | 3 | 1 |
| 4 | 2 | 4 | 2 |

CB

| ↑ INT ↓ | ↑ INT ↓ | ↑ INT ↓ | ↑ INT ↓ |
|---|---|---|---|
| Wb22 ⊖ Gr21 | Wb22 ⊖ Gr23 | Wb24 ⊖ Gr23 | Wb24 ⊖ Gr25 |
| ↑ INT ↓ | ↑ INT ↓ | ↑ INT ↓ | ↑ INT ↓ |
| Wb41 ⊖ Gr42 | Wb43 ⊖ Gr42 | Wb43 ⊖ Gr44 | Wb45 ⊖ Gr44 |

FIG. 3C  PRIOR ART

| Wr11 | Gb12 | Wr13 | Gb14 |
|------|------|------|------|
| Gr21 | Wb22 | Gr23 | Wr24 |
| Gb31 | Wr32 | Gb33 | Wr34 |
| Wb41 | Gr42 | Wb43 | Gr44 |

YL

| Wr11 ⊕ Gb12 | Wr13 ⊕ Gb12 | Wr13 ⊕ Gb14 | Wr15 ⊕ Gb14 |
|---|---|---|---|
| Wb22 ⊕ Gr21 | Wb22 ⊕ Gr23 | Wb24 ⊕ Gr23 | Wb24 ⊕ Gr25 |
| Wr32 ⊕ Gb31 | Wr32 ⊕ Gb33 | Wr34 ⊕ Gb33 | Wr34 ⊕ Gb35 |
| Wb41 ⊕ Gr42 | Wb43 ⊕ Gr42 | Wb43 ⊕ Gr44 | Wb45 ⊕ Gr44 |

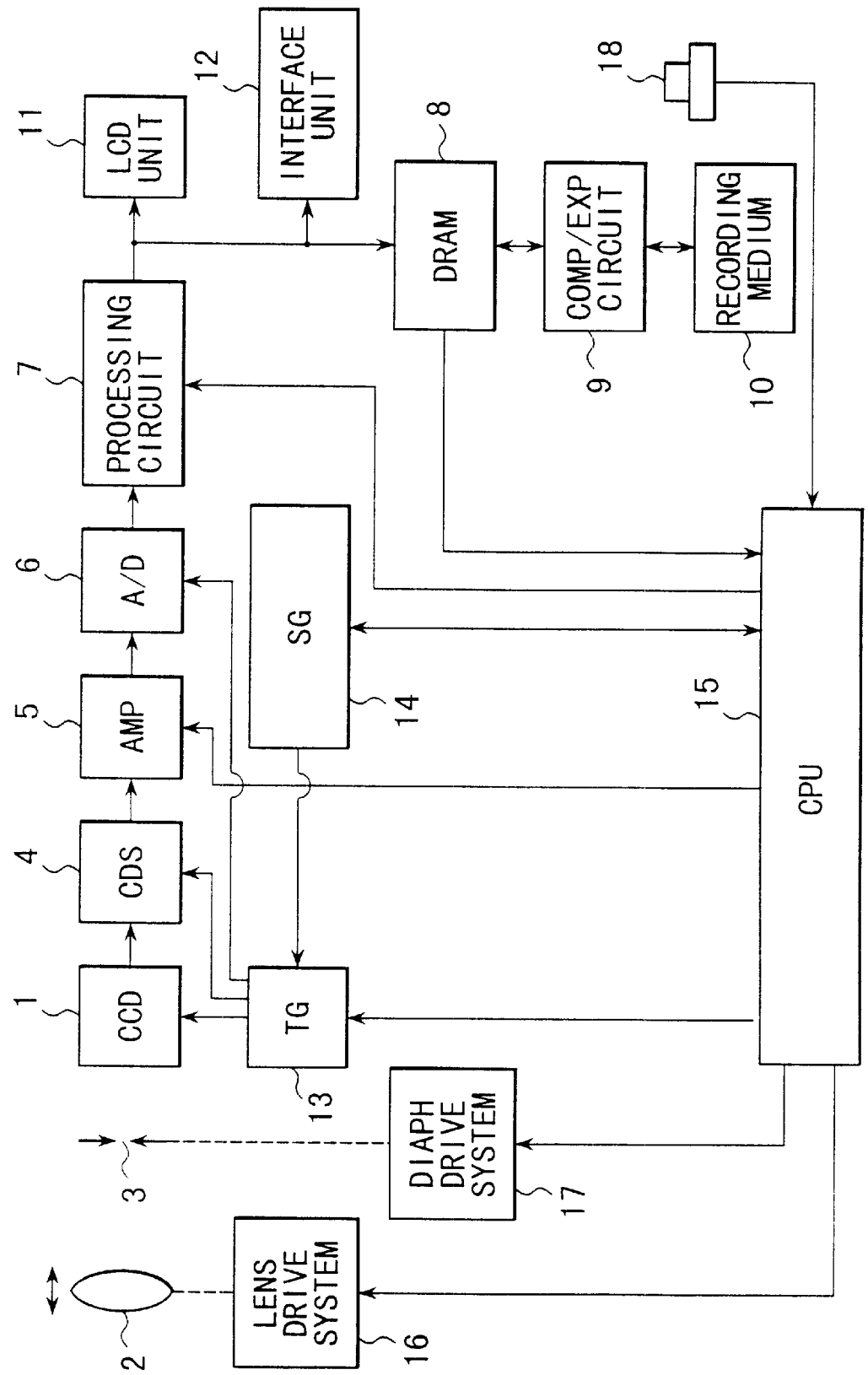

FIG. 10A

| Ye11 | Mg12 | Cy13 | G14 |
|---|---|---|---|
| Cy21 | G22 | Ye23 | Mg24 |
| Ye31 | Mg32 | Cy33 | G34 |
| Cy41 | G42 | Ye43 | Mg44 |

CR

| Ye11+Mg12<br>⊖<br>Cy13+G10 | Ye11+Mg12<br>⊖<br>Cy13+G14 | Ye15+Mg16<br>⊖<br>Cy13+G14 | Ye15+Mg16<br>⊖<br>Cy17+G14 |
|---|---|---|---|

| Ye31+Mg32<br>⊖<br>Cy33+G30 | Ye31+Mg32<br>⊖<br>Cy33+G34 | Ye35+Mg36<br>⊖<br>Cy33+G34 | Ye35+Mg36<br>⊖<br>Cy37+G34 |
|---|---|---|---|

FIG. 10B

| 1 | 2 | 3 | 4 |
|---|---|---|---|
| 3 | 4 | 1 | 2 |
| 1 | 2 | 3 | 4 |
| 3 | 4 | 1 | 2 |

CB

| Cy13+Mg12<br>⊖<br>Ye11+G10 | Cy13+Mg12<br>⊖<br>Ye11+G14 | Cy13+Mg16<br>⊖<br>Ye15+G14 | Cy17+Mg16<br>⊖<br>Ye15+G14 |
|---|---|---|---|

| Cy33+Mg32<br>⊖<br>Ye31+G30 | Cy33+Mg32<br>⊖<br>Ye31+G34 | Cy33+Mg36<br>⊖<br>Ye35+G34 | Cy37+Mg36<br>⊖<br>Ye35+G34 |
|---|---|---|---|

FIG. 10C

| Ye11 | Mg12 | Cy13 | G14 |
|---|---|---|---|
| Cy21 | G22 | Ye23 | Mg24 |
| Ye31 | Mg32 | Cy33 | G34 |
| Cy41 | G42 | Ye43 | Mg44 |

YL

| Ye11+Mg12<br>⊕<br>Cy13+G10 | Ye11+Mg12<br>⊕<br>Cy13+G14 | Ye15+Mg16<br>⊕<br>Cy13+G14 | Ye15+Mg16<br>⊕<br>Cy17+G14 |
|---|---|---|---|

| Ye31+Mg32<br>⊕<br>Cy33+G30 | Ye31+Mg32<br>⊕<br>Cy33+G34 | Ye35+Mg36<br>⊕<br>Cy33+G34 | Ye35+Mg36<br>⊕<br>Cy37+G34 |
|---|---|---|---|

IMAGE PICKUP APPARATUS WITH NON-DEBASED HUE AND LUMINANCE WHEN READING ALL PIXELS AND COLOR GENERATION PERFORMED BY SINGLE LINES WHEN READING SKIPPED LINES

BACKGROUND OF THE INVENTION

The present invention relates to single-plate color solid-state image pickup apparatus in which the resolution characteristics of hue and luminance are not debased when all the pixels are read out and yet color generation can be performed by a single line where lines are skipped (thinned out) when read out.

Color filter array constructed as shown in FIGS. 1A, 1B, 1C are known as using complementary color filters of the generally used type to produce color signals when all pixels of the image-pickup device are sequentially read out in a single-plate color solid-state image pickup apparatus. In this color filter array, four color filters Ye, Mg, Cy and G are arranged in the manner of a mosaic. FIG. 1A shows the signal processing mode for producing CR signal; FIG. 1B shows the signal processing mode for producing CB signal; and FIG. 1C shows the signal processing mode for producing YL signal. It should be noted that CR signal corresponds to (R−Y) color-difference signal, CB to (B−Y) color-difference signal, and YL to Y signal. Color signals (RGB) can be produced by combining these three signals. The numerals 1, 2, 3 and 4 in FIG. 1B correspond to Ye, Mg, Cy and G, respectively, representing their order of arrangement which may be considered as the like of the array shown in FIGS. 1A and 1C. The complementary color filters Ye, Mg and Cy are the filters for indicating the components of Ye=R+G, Mg=R+B and Cy=B+G, respectively. Further, the CR signal, CB signal and YL signal can be expressed as in the following equations (1), (2) and (3):

$$CR=(Ye+Mg)-(Cy+G)=2R-G \qquad (1)$$

$$CB=(Cy+Mg)-(Ye+G)=2B-G \qquad (2)$$

$$YL=Ye+Mg+Cy+G=2R+3G+2B \qquad (3)$$

A description will now be given with respect to the mode of producing CR signal as shown in FIG. 1A. For the first pixel of the first line of FIG. 1A, CR signal of the first pixel can be produced by the signal processing of (Ye11+Mg21)−(Cy12+G22). CR signal of the second pixel is produced by the signal processing of (Ye13+Mg23)−(Cy12+G22). By sequentially forming CR signals of the pixels of third and after in a similar manner, all the CR signals for the first line can be provided onto the line. At the first pixel of the third line, CR signal of the first pixel can be produced in a similar manner as in the first line by the signal processing of (Ye32+Mg42)−(Cy31+G41). A similar signal processing can be performed for the second and third pixels of the third line and also for other odd-number lines to produce CR signals onto all the odd-number lines. CR signal of the even-number lines, for example of the first pixel of the second line, can be produced by interpolating between the CR signals of above and below, i.e., the first pixel of the first line and the first pixel of the third line. It should be noted that, in the figures, an interpolation for producing a signal is represented by its abbreviation "INT" and the direction of such interpolation is indicated by arrow. CR signals corresponding to other even-number lines can be also produced by vertically interpolating in a similar manner. Production is thus possible of the CR signals corresponding to all the pixels. Further, the CB signals and YL signals can be produced by performing signal processing as shown in FIGS. 1B and 1C.

Shown in FIG. 2 is a block diagram of a digital circuit for processing signal to produce CR, CB and YL signals, the operation of which will be described below with reference to FIGS. 1A, 1B, 1C. First, addition of lines (vertical addition) is performed by adding together and averaging input signal SigIN and a signal obtained by delaying input signal SigIN by 1H (line). In particular, the line addition is sequentially performed for example as first line+second line, second line+third line. Next, to produce YL signal (FIG. 1C), signal A derived from such line addition and signal B derived from delaying of signal A by 1D (data) are added together and averaged to obtain a horizontally added signal which becomes YL signal.

To produce CR signal (FIG. 1A) and CB signal (FIG. 1B) signal (A−B) derived from subtraction from the line added signal A of signal B which is obtained by delaying signal A by 1D (data), and signal (B−A) derived from the inverted subtraction thereof are alternately selected for each 1D (data). Thus obtained signal is CR/CB signal. The CR/CB becomes CR signal for the odd-number lines and CB signal for the even-number lines. Accordingly, a signal obtained by adding together and averaging (vertically interpolating) CR/CB signal and one derived from 2H-delay of CR/CB signal, and a signal obtained by delaying CR/CB signal by 1H can be alternately selected for each 1H to form CR signal and CB signal.

A description will be given below by way of FIG. 3 with respect to a known system for producing color signals by using a mixed complementary color filter when all pixels of the image-pickup device are sequentially read out similarly as the above. A mixed complementary color filter array is formed by arranging four color filters Wr, Gr, Gb and Wb in the manner of a mosaic as shown in FIGS. 3A, 3B, 3C. FIG. 3A shows the signal processing mode for producing CR signal; FIG. 3B shows the signal processing mode for producing CB signal; and FIG. 3C shows the signal processing mode for producing YL signal. It should be noted that a disclosure has been made in Japanese Patent Publication No.Hei-1-42192 with respect to the mixed complementary color filter.

The numerals 1, 2, 3 and 4 in FIG. 3B correspond to Wr, Gr, Gb and Wb, respectively, representing their order of arrangement which may be considered as the like of the array shown in FIGS. 3A and 3C. The mixed complementary color filters Wr, Gr, Gb and Wb are the filters possessing the components of Wr=Ye+Mg, Gr=Ye+G, Gb=Cy+G and Wb=Cy+Mg, respectively. Further, from Ye=R+G, Mg=R+B and Cy=B+G, the signals CR, CB and YL can be expressed by the following equations (4), (5) and (6):

$$CR=(Ye+Mg)-(Cy+G)=Wr-Gb=2R-G \qquad (4)$$

$$CB=(Cy+Mg)-(Ye+G)=Wb-Gr=2B-G \qquad (5)$$

$$YL=Ye+Mg+Cy+G=Wr+Gb=Wb+Gr=2R+3G+2B \qquad (6)$$

A description will now be given with respect to the mode of producing CR signal as shown in FIG. 3A. For the first pixel of the first line of FIG. 3A, CR signal of the first pixel can be produced by the signal processing of (Wr11−Gb12). CR signal of the second pixel is produced by the signal processing of (Wr13−Gb12). By sequentially forming the CR signals of the pixels of third and after in a similar manner, all the CR signals of the first line can be provided onto the line. At the first pixel of the third line, CR signal of the first pixel can be produced in a similar manner as in the first line by the signal processing of (Wr32−Gb31). By performing a similar signal processing for the second and third pixels of the third line and also for other odd-number lines, CR signal can be provided onto all the odd-number lines. CR signal of the even-number lines, for example of the first pixel of the second line, can be produced by interpolating between the CR signals of above and below, i.e., the first pixel of the first line and the first pixel of the third line. The CR signals corresponding to other even-number lines can be also produced by vertical interpolation in a similar manner. Production is thus possible of the CR signals corresponding to all the pixels. Further, the CB signals and YL signals can be produced by performing signal processing as shown in FIGS. 3B and 3C.

Shown in FIG. 4 is a block diagram of a digital circuit for processing signal to produce CR, CB and YL signals when using the above-described mixed complementary filter array, the operation of which will be described below with reference to FIGS. 3A, 3B and 3C. This digital signal processing circuit omits the first line addition (vertical addition) processing part in the digital signal processing circuit of the case of forming color signals using the complementary color filter array shown in FIG. 2. First, to produce YL signal, a horizontally added signal is obtained by adding together and averaging input signal SigIN (signal A) and signal B derived from delaying of signal A by 1D (data). This becomes YL signal [FIG. 3C].

To produce CR signal (FIG. 3A) and CB signal (FIG. 3B) signal (A−B) derived from subtraction from input signal (SigIN)A of signal B which is obtained by delaying the signal A by 1D (data), and signal (B−A) derived from the inverted subtraction thereof are alternately selected for each 1D (data). Thus obtained signal is CR/CB signal. The CR/CB becomes CR signal for the odd-number lines and CB signal for the even-number lines. Accordingly, a signal obtained by adding together and averaging (vertically interpolating) CR/CB signal and one derived from 2H-delay of CR/CB signal, and a signal obtained by delaying CR/CB signal by 1H can be alternately selected for each 1H to form CR signal and CB signal.

A description will be given below by way of FIGS. 5A, 5B, 5C with respect to a conventional system for producing color signals by using RGB primary color filters when all pixels of the image-pickup device are sequentially read out similarly as-the above. An RGB primary color filter array as shown in FIGS. 5A, 5B, 5C is the color filter array of the so-called Bayer arrangement. FIG. 5A shows the processing mode for producing R signal; FIG. 5B shows the processing mode for producing B signal; and FIG. 5C shows the processing mode for producing G signal. The numerals 1, 2, 3 and 4 in FIG. 5B correspond to R, B, G and G, respectively, representing their order of arrangement which may be considered as the like of the array shown in FIGS. 5A and 5C.

A description will now be given with respect to the mode of producing R signal as shown in FIG. 5A. In the case of producing R signal, the signals corresponding to filters R11, R13, R31 and R33 are extracted in their unmodified state, and interpolations in right-and-left and in up-and-down directions are performed based on these R signals to produce all the R signals. B signals are produced also by performing a similar processing as shown-in FIG. 5B. G signals, too, are produced by performing similar interpolations as shown in FIG. 5C, though G filter outnumbers others. R, G, B signals can be produced by the above processing.

Shown in FIG. 6 is a block diagram of a digital circuit for processing signal to produce color signals using the above-described RGB primary color filter array, the operation of which will be described below with reference to FIGS. 5A, 5B, 5C. First, to produce R signal (FIG. 5A) and B signal (FIG. 5B), interpolation between lines in up and down direction is possible by selecting for each 1H from a signal obtained by adding together and averaging input signal SigIN and signal derived from 2H-delay of SigIN, and a signal obtained by delaying the input signal SigIN by 1H. Thereby, R/G signal and B/G signal are formed. A signal obtained by adding together and averaging such R/G signal and signal derived from delaying of R/G signal by 2D (data), and a signal obtained by delaying R/G signal by 1D (data) are alternately selected for each 1D to produce R signal. Similarly, a signal obtained by adding together and averaging B/G signal and signal derived from delaying of B/G signal by 2D, and a signal obtained by delaying B/G signal by 1D are alternately selected for each 1D to produce B signal. In respect of G signal, a signal obtained by delaying input signal SigIN by 1H and 1D, and a signal obtained by adding together and averaging a signal obtained by adding together and averaging input signal SigIN and signal derived from 2H-delay of the input signal SigIN and a signal obtained by delaying such signal by 2D are alternately selected for each 1D to produce G signal.

Generally, when emphasis is on the resolution in constructing the color filter array of a solid-state image pickup device in a single-plate color solid-state image pickup apparatus, one based on a color line-by-line sequential system such as the above-described color filter arrays is advantageous. However, since a greater number of pixels are used in constructing the recent solid-state image pickup apparatus such as those in the electronic cameras using CCD imaging device, the pixels thereof are subject to a skip readout and not all of them are read out except for the case of recording a still image. In particular, they are thinned out when read out to correspond for example to the performing of AE/AF operation and displaying of an image on a liquid crystal display unit which require a high-speed processing.

If, for example, every other line is simply thinned out when read out by applying a skip readout system to a single-plate color solid-state image pickup apparatus using a color filter array of the color line-by-line sequence system, it is impossible to obtain data consisting of a line-by-line sequence. For example, if a thinned-out readout is performed by omitting every other line when a complementary color filter array of the structure as shown in FIGS. 1A, 1B, 1C is employed, there is a case where only the components of CR signal can be extracted, as CR signal from the first line, CR signal from the third line and CR signal from the fifth line, too. In this case, CB signal cannot be extracted, resulting in a problem that color signals cannot be formed within one frame.

Such problem occurs also in the case of using the mixed complementary color filter array shown in FIGS. 3A, 3B, 3C, or using the primary color filter array shown in FIGS. 5A, 5B, 5C. In particular, CR signal and CB signal are alternately outputted for example in the order of CR, CB, CR, CB in the color signal forming method using the mixed complementary color filter array shown in FIGS. 3A, 3B, 3C. Similarly to the case of using the complementary color filter array, therefore, this results in only CR signal or only CB signal being outputted when a skip readout of every other line is performed, making it impossible to produce color signals within one frame. Further, in the case of using the primary color filter array shown in FIGS. 5A, 5B, 5C, a thinned-out readout of every other line may results in a state where only the components of R, G signals can be extracted as R, G from the first line, R, G from the third line and R, G from the fifth line, too. It becomes impossible to extract B signal and color signals cannot be formed within one frame.

SUMMARY OF THE INVENTION

In view of the above problems with the single-plate color solid-state image pickup apparatus using known color filter arrays, it is an object of the present invention to provide a single-plate solid-state color image pickup apparatus using a color filter array capable of deriving color signals from a single line in the case where lines are skipped (thinned out) when read out, without debasing the resolution characteristics of hue and luminance when all the pixels are read out.

In accordance with a first aspect of the present invention, there is provided a single-plate color solid-state image pickup apparatus including a solid-state image pickup-device having a plurality of pixels arrayed in horizontal and vertical directions, and a color filter array consisting of a plurality of color filters arrayed in horizontal and vertical directions correspondingly to the respective pixels of the solid-state image pickup device. The color filter array comprises complementary color filters, constructed by sequentially arranging color filter columns in horizontal direction in a repeating cycle of four pixels of first, second, third, and fourth. First color-difference signals are obtained as modulated signals periodically in a certain number of pixels from "first+second" and "third+fourth" pixel columns, and second color-difference signals are obtained as modulated signals periodically in the same pixel number as the first color-difference signals from "second+third" and "fourth+fifth" pixel columns, wherein the first and second color-difference signals obtained from "third+fourth" and "fourth+fifth" pixel columns are different respectively in phase by 180 degrees from the first and second color-difference signals obtained from "first+second" and "second+third" pixel columns.

Further, in accordance with a second aspect of the invention, the single-plate color solid-state image pickup apparatus of the first aspect includes control means for driving and controlling said solid-state image pickup device, the control means having a drive function of the mode for recording a still image by extracting pixel signals of all the pixels by sequentially scanning said solid-state image pickup device and a drive function of the mode for recording a still image or for performing a dynamic image processing by extracting pixel signals of every n (n being an integer of 1 or greater) lines out of every m (m being an integer of 2 or greater) lines in the vertical direction from said solid-state image pickup device.

Furthermore, in accordance with a third aspect of the invention, the single-plate color solid-state image pickup apparatus of the second aspect, when performing the operation of recording a still image or processing a dynamic image by extracting pixel signals of n lines out of every m lines in the vertical direction from said solid-state image pickup device, is constructed to generate color signals by each single line by means of a row of color filters of 4-pixel repeating cycle of first, second, third and fourth in the horizontal direction.

By using a color filter array consisting of complementary color filters arranged as the above, the resolution characteristics of hue and luminance are not debased when all the pixels are read out without increasing the rate of operating clock, and color signals can be generated by a single line when lines are skipped in readout. It is therefore possible to avoid a deviation in colors no matter how the lines are skipped when read out.

In accordance with a fourth aspect of the present invention, there is provided a single-plate color solid-state image pickup apparatus including a solid-state image pickup device having a plurality of pixels arrayed in horizontal and vertical directions, and a color filter array consisting of a plurality of color filters arrayed in horizontal and vertical directions correspondingly to the respective pixels of the solid-state image pickup device. The color filter array comprises mixed complementary color filters, constructed by sequentially arranging color filter columns in horizontal direction in a repeating cycle of four pixels of first, second, third, and fourth. First color-difference signals are obtained as modulated signals periodically in a certain number of pixels from first and third pixel columns, and second color-difference signals are obtained as modulated signals periodically in the same pixel number as the first color-difference signals from second and fourth pixel columns, wherein the first and second color-difference signals obtained from third and fourth pixel columns are different respectively in phase by 180 degrees from the first and second color-difference signals obtained from first and second pixel columns.

Further, in accordance with a fifth aspect of the invention, the single-plate color solid-state image pickup apparatus of the fourth aspect includes control means for driving and controlling said solid-state image pickup device, the control means having a drive function of the mode for recording a still image by extracting pixel signals of all the pixels by sequentially scanning said solid-state image pickup device and a drive function of the mode for recording a still image or for performing a dynamic image processing by extracting pixel signals of every n (n being an integer of 1 or greater) lines out of every m (m being an integer of 2 or greater) lines in the vertical direction from said solid-state image pickup device.

Furthermore, in accordance with a sixth aspect of the invention, the single-plate color solid-state image pickup apparatus of the fifth aspect, when performing the operation of recording a still image or processing a dynamic image by extracting pixel signals of n lines out of every m lines in the vertical direction from said solid-state image pickup device, is constructed to generate color signals by each single line by means of a row of color filters of 4-pixel repeating cycle of first, second, third and fourth in the horizontal direction.

By using a color filter array consisting of mixed complementary color filters arranged as the above, the resolution characteristics of hue and luminance are not debased when all the pixels are read out. Since, furthermore, color signals can be generated by a single line when lines are skipped in readout, a deviation in colors is not caused no matter how the lines are skipped when read out. Further, human eyes are vested with a higher resolution in horizontal direction than in the vertical direction. Accordingly, the color line-by-line sequential system where luminance signal is generated by adding together pixels adjacent to each other in horizontal direction is disadvantageous in that it causes the resolution in horizontal direction to be degraded. In the above described fourth, fifth and sixth aspects of the present invention, however, the horizontal resolution can be improved comparing to that of using the mixed complementary color filters of the known color line-by-line sequential system, since pixels adjacent to each other in the vertical direction are added together to generate a luminance signal.

In accordance with a seventh aspect of the present invention, there is provided a single-plate color solid-state image pickup apparatus including a solid-state image pickup device having a plurality of pixels arrayed in horizontal and vertical directions, a color filter array consisting of color filters of three kinds different one another in spectral sensitivity, arrayed in horizontal and vertical directions correspondingly to the respective pixels of the solid-state image pickup device, and control means for driving and controlling the solid-state image pickup device, the control means having a drive function of the mode for recording a still image by extracting pixel signal of all the pixels through a sequential scan of the solid-state image pickup device and a drive function of the mode for recording a still image or processing a dynamic image by extracting pixel signals of every n (n being an integer of 1 or greater) lines out of every m (m being an integer of 2 or greater) lines in the vertical direction from the solid-state image pickup device. The color filter array is consisting of primary color filters, each row of the color filters being arranged in the order of the color filters of first, second, third and third in the horizontal direction, wherein the color filter row of n+1'th line is shifted by 2-pixel pitch in the horizontal direction in relation to the color filter row of n'th line.

Furthermore, in accordance with a eighth aspect of the invention, the single-plate color solid-state image pickup apparatus according to the seventh aspect of the invention, when performing the operation of recording a still image or processing a dynamic image by extracting pixel signals of n lines out of every m lines in the vertical direction from the solid-state image pickup device, is constructed to generate color singles by each single line by means of a row of color filters of 4-pixel repeating cycle of first, second, third and fourth in the horizontal direction.

By using a color filter array consisting of primary color filters arranged as the above, similarly to the cases of the above described first to sixth aspects, the resolution characteristics of hue and luminance are not debased when all the pixels are read out. Since, furthermore, color signals can be generated by a single line when lines are skipped in readout, deviation in colors is not caused no matter how the lines are skipped when read out.

BRIEF DESCRIPTION OF THE DRAWING

FIGS. 3A, 3B, 3C show the structure of a known mixed complementary color filter array and the manner of signal processing for producing color signals in a full-pixel readout mode using such filter array.

FIG. 7 is a block diagram of the overall construction of an embodiment of a single-plate color solid-state image pickup apparatus according to the present invention.

FIGS. 10A, 10B, 10C show the manner of signal processing for producing color signals in a skip readout mode in the first embodiment of color filter array as shown in FIGS. 8A, 8B, 8C.

DESCRIPTION OF THE PREFERRED EMBODIMENTS

Figure 1A:
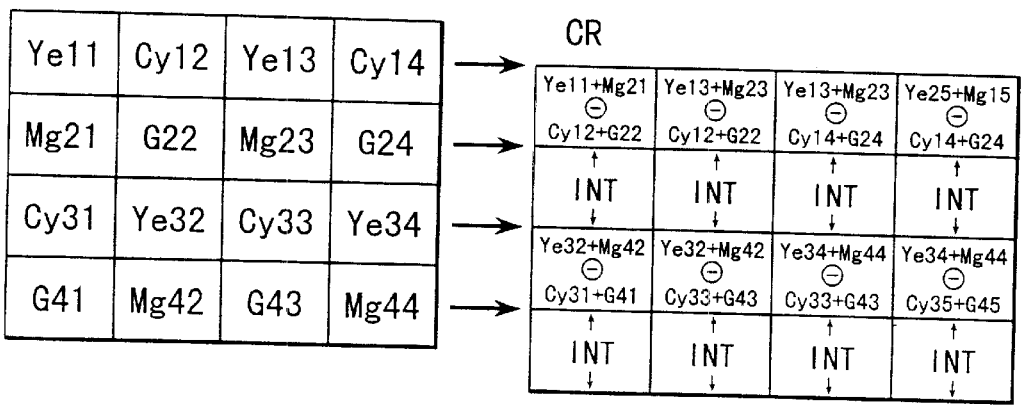
FIGS. 1A, 1B, 1C show the structure of a known complementary color filter array and the manner of signal processing for producing color signals in a full-pixel readout mode using such filter array.

An embodiment of the present invention will now be described. FIG. 7 is a block diagram of the overall construction of a single-plate color solid-state image pickup apparatus according to the present invention when it is applied to an electronic camera. Referring to FIG. 7, denoted by reference numeral 1 is a CCD image pickup device for photoelectrically converting an optical signal into an electrical signal. The CCD image pickup device 1 includes a color filter array. Light is inputted to CCD image pickup device 1 through lens 2 which includes a focusing lens and a diaphragm 3 which controls the quantity of light. Denoted by numeral 4 is a correlative double sampling circuit (CDS) for removing noise from the output of CCD image pickup device 1. An amplifier 5 amplifies the output of the correlative double sampling circuit 4. The output of the amplifier 5 consisting of analog data is converted into digital data through an analog-to-digital converter 6. Signals from CCD image pickup device 1 are processed as a video data at a processing circuit 7. The video data having been subjected to signal processing at the processing circuit 7 is temporarily stored to DRAM 8. A compression/expansion circuit 9 compresses video data which is stored at the DRAM 8 and expands the compressed data. The compressed data is recorded at recording medium 10 while the recorded data to be read out from the recording medium 10 is expanded.

A liquid crystal display unit 11 displays on liquid crystal screen the video data which has been obtained by processing the signals from CCD image pickup device 1. Denoted by numeral 12 is an interface unit for external displaying through which the video data is displayed on an external monitor, etc. A timing generator 13 controls timing of CCD image pickup device 1, etc. SG circuit 14 transmits a timing signal to the timing generator 13. The operation of all of the above described parts is controlled by CPU 15. Denoted by numerals 16, 17 and 18 are a lens drive system, a diaphragm drive system and a release mechanism, respectively.

In an electronic camera constructed as the above, an electrical signal obtained by the photoelectric conversion at CCD image pickup device 1 is transmitted through the correlative double sampling circuit 4, amplifier 5, analog-to-digital converter 6 and processed at the processing circuit 7 to become a video signal. The first video signal is recorded on recording medium 10 or displayed on liquid crystal display unit 11 so as to adjust angle of view in respect of how to record a still image. In the end, a still image is recorded at the recording medium 10. Here, CCD image pickup device 1 is controlled by CPU 15 such that it is driven in a full-pixel readout mode where signal charges of all the pixels are read out or in a skip readout mode where pixel signals are skipped (thinned out) when they are read out.

Figure 1B:
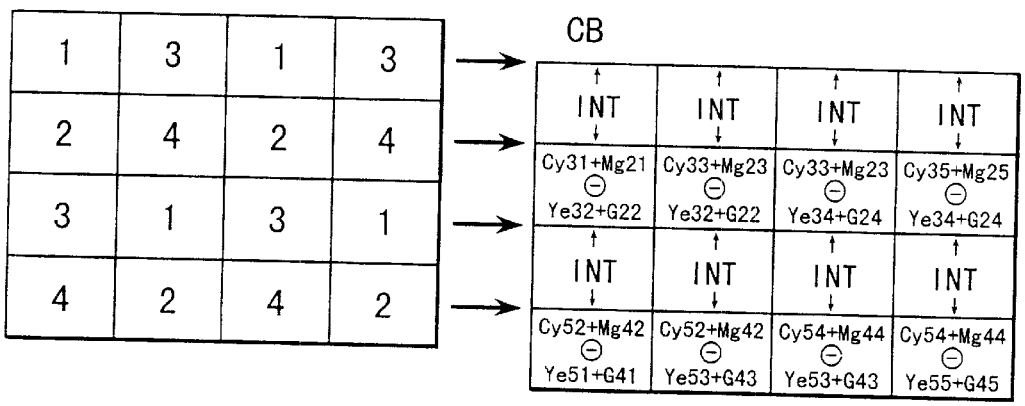
Figure 8A:
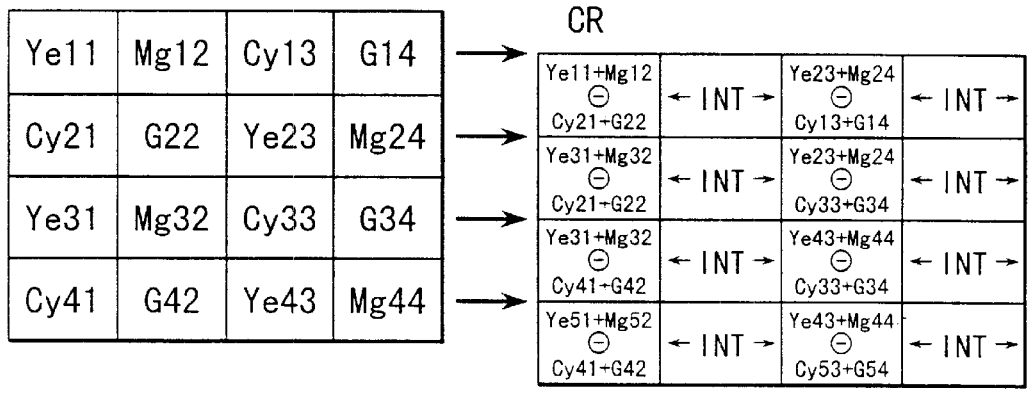
FIGS. 8A, 8B, 8C show a first embodiment of color filter array to be used in CCD image pickup device shown FIG. 7 and the manner of signal processing for producing color signals in a full-pixel readout mode.
Figure 8B:
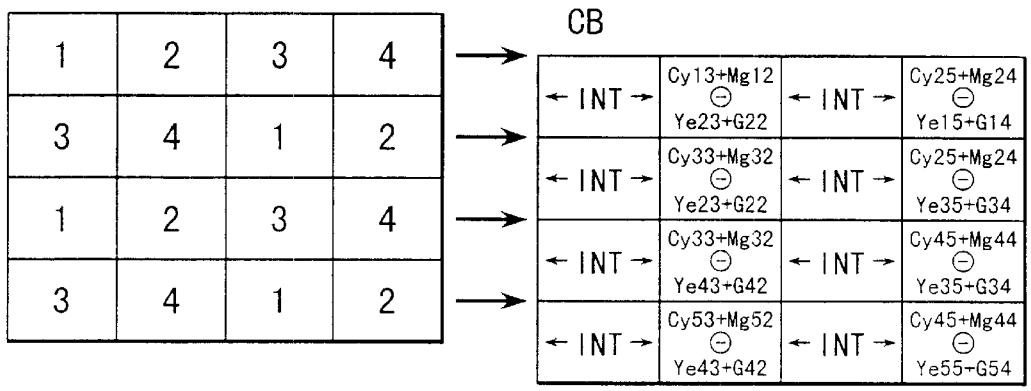
Figure 8C:
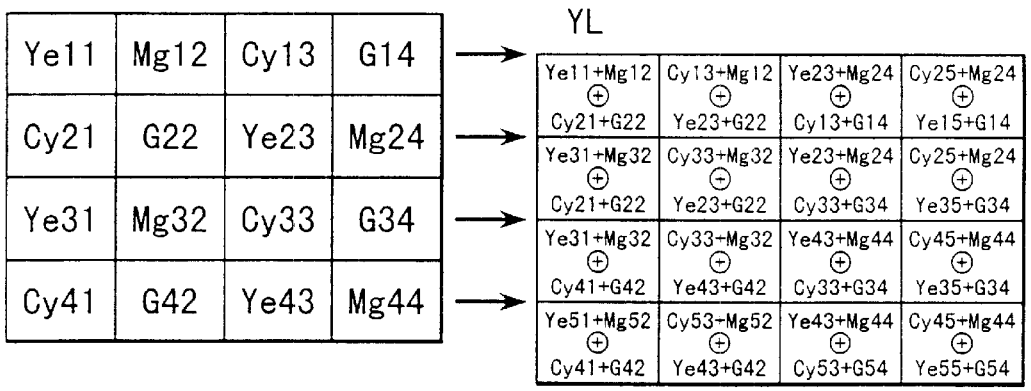

A description will now be given by way of FIGS. 8A, 8B, 8C with respect to a first embodiment of color filter array used in CCD image pickup device 1. This embodiment corresponds to the first to third aspects of the invention. In the embodiment illustrated in FIGS. 8A, 8B, 8C, the present invention is applied to a color filter array consisting of complementary color filters, shown on the right side of FIGS. 8A, 8B, 8C being the signal processing mode for producing color signals (CR, CB, YL) when all pixels are sequentially read out using the complementary color filter array. When Ye, Mg, Cy and G are represented by numerals 1, 2, 3 and 4, respectively, the complementary color filter array is arranged as shown in FIG. 8B. As can be seen from a comparison with the known complementary color filter array shown in FIG. 1B, it has an arrangement like that obtained by turning the known complementary color filters by 90 degrees. The complementary color filter array of the present embodiment is characterized in that the respective color filters of Ye, Mg, Cy and G are included in each single line. It should be noted that, while a complementary color filter array of 4×4 construction is shown in FIGS. 8A, 8B, 8C, the entire complementary color filter array is constructed by repeated placements of array having the illustrated arrangement in both right and left and up and down directions.

Figure 1C:
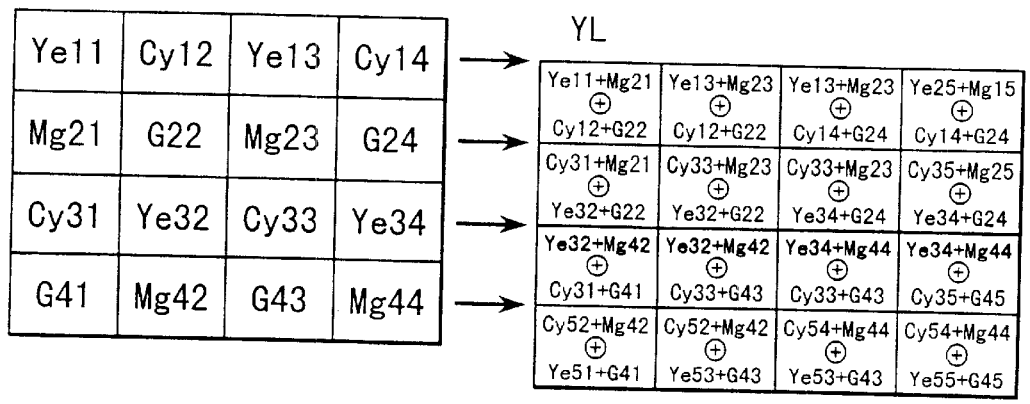
Figure 2:
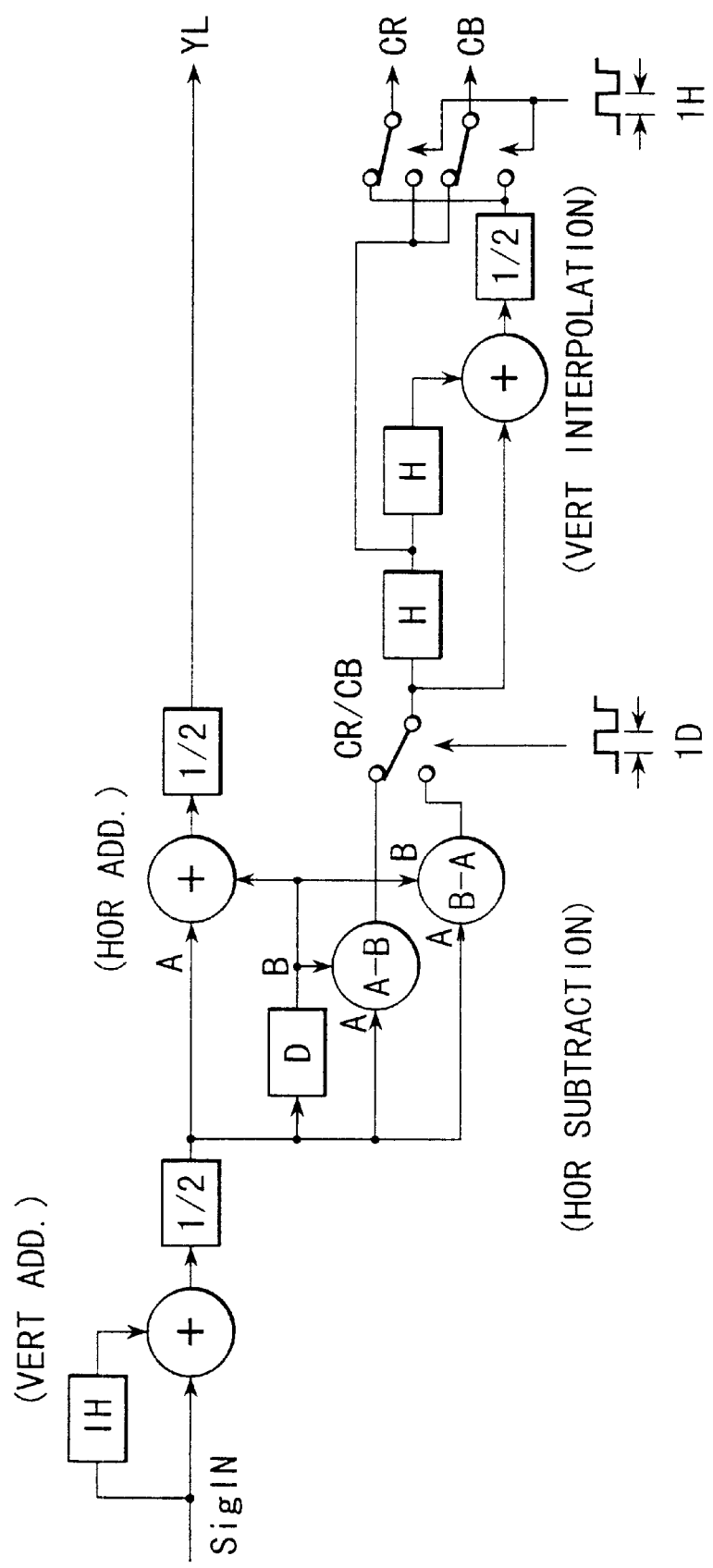
FIG. 2 is a block diagram of a digital circuit for processing signal to produce color signals as shown in FIGS. 1A, 1B, 1C.
Figure 4:
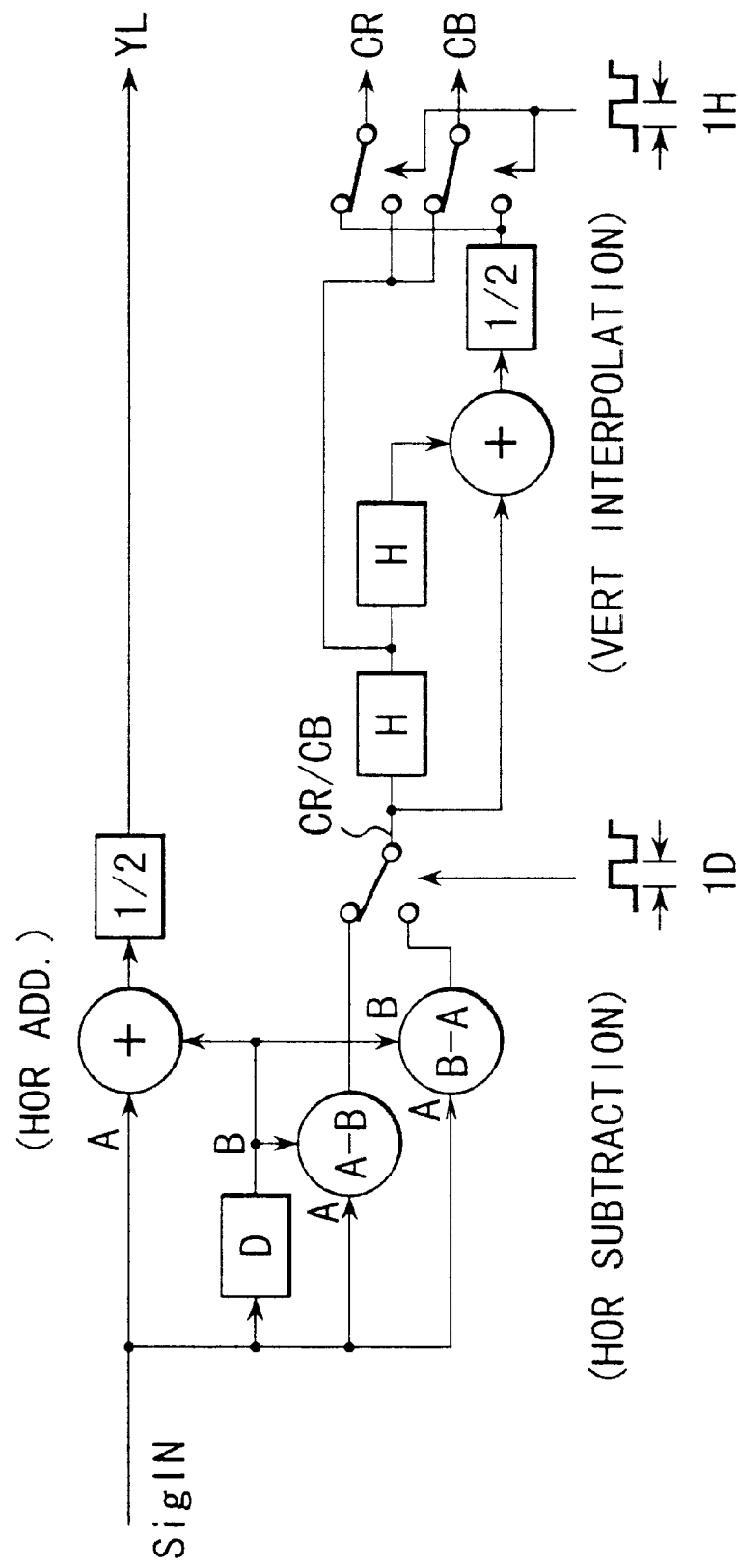
FIG. 4 is a block diagram of a digital circuit for processing signal to produce color signals as shown in FIGS. 3A, 3B, 3C.

A description will now be given with respect to production of the signals of CR, CB, YL when all pixels are to be read out using this complementary color filter array. In a similar manner as the known example shown in FIGS. 1A, 1B, 1C, CR signal can be obtained from (Ye+Mg)−(Cy+G), CB signal from (Cy+Mg)−(Ye+G) and YL signal from (Cy+Mg+Ye+G). However, while CR/CB signal is outputted for each single line in the known example, the present embodiment is constructed so that CR/CB signal is obtained for each single column. Thus CR, CB, YL signals can be produced without degrading resolution when readout is performed in a full-pixel readout mode. Further, since CR, CB, YL signals can be obtained and color signals can be generated for each single line, deviation of colors is prevented from occurring.

A description will be given in further detail below with respect to the production of the above described CR, CB signals in this embodiment. Referring first to FIG. 8A, based on the signals from the first vertical pixel column and second vertical pixel column, CR signal of the first pixel of the first line is produced by signal processing of (Ye11+Mg12)−(Cy21+G22), CR signal of the first pixel of the second line by signal processing of (Ye31+Mg32)−(Cy21+G22), CR signal of the first pixel of the third line by signal processing of (Ye31+Mg32)−(Cy41+G42), and CR signal of the first pixel of the fourth line by signal processing of (Ye51+Mg52)−(Cy41+G42). It should be noted that Ye51, Mg52 represent complementary color filters adjacent to the bottom of Cy41, G42 in FIG. 8A. Thereafter CR signals are similarly produced vertically in a 4-pixel cycle to obtain the CR signals of the first vertical column.

Also in respect of CR signals, based on the signals of the third pixel column and fourth pixel column, signals are processed as (Ye23+Mg24)−(Cy13+G14), (Ye23+Mg24)−(Cy33+G34), (Ye43+Mg44)−(Cy33+G34), (Ye43+Mg44)−(Cy53+G54) and such signal processing is repeated to produce the CR signals of the third vertical column. It should be noted that Cy53, G54 represent complementary color filters which are located adjacently to the bottom of Ye43, Mg44. Here, as can be seen from such signal processing, there is a 180-degree difference in phase between the CR signals of the first vertical column and the CR signals of the third vertical column. CR signals of the second vertical column and fourth vertical column are respectively derived from a left-and-right (horizontal) interpolation.

In respect of CB signals, as shown in FIG. 8B, the CB signals of the second vertical column are produced by the respective signal processing of (Cy13+Mg12)−(Ye23+G22), (Cy33+Mg32)−(Ye23+G22), (Cy33+Mg32)−(Ye43+G42), (Cy53+Mg52)−(Ye43+G42) and repetition of such signal processing, based on the signals of the second vertical pixel column and the third vertical pixel column. Further, the CB signals of the fourth vertical column are produced by the respective signal processing of (Cy25+Mg24)−(Ye15+G14), (Cy25+Mg24)−(Ye35+G34), (Cy45+Mg44)−(Ye35+G34), (Cy45+Mg44)−(Ye55+G54) and repetition of such processing, based on the signals of the fourth vertical pixel column and the fifth vertical pixel column which is arranged as having a cycle in a manner adjacent to the fourth vertical pixel column. It should be noted that Ye15, Cy25, Ye35, Cy45 are the complementary color filters which are located adjacently to the right side of G14, Mg24, G34, Mg44 in FIG. 8A. Further, G54 is the complementary color filter adjacent to the bottom of Mg44; and Ye55 is the complementary color filter adjacent to the right side of G54. Here, similarly to CR signals, a 180-degree difference in phaso occurs between the CB signals of the second vertical column and the CB signals of the fourth vertical column. CR signals of the first vertical column and the third vertical column are respectively derived from a left-and-right (horizontal) interpolation.

Figure 9:
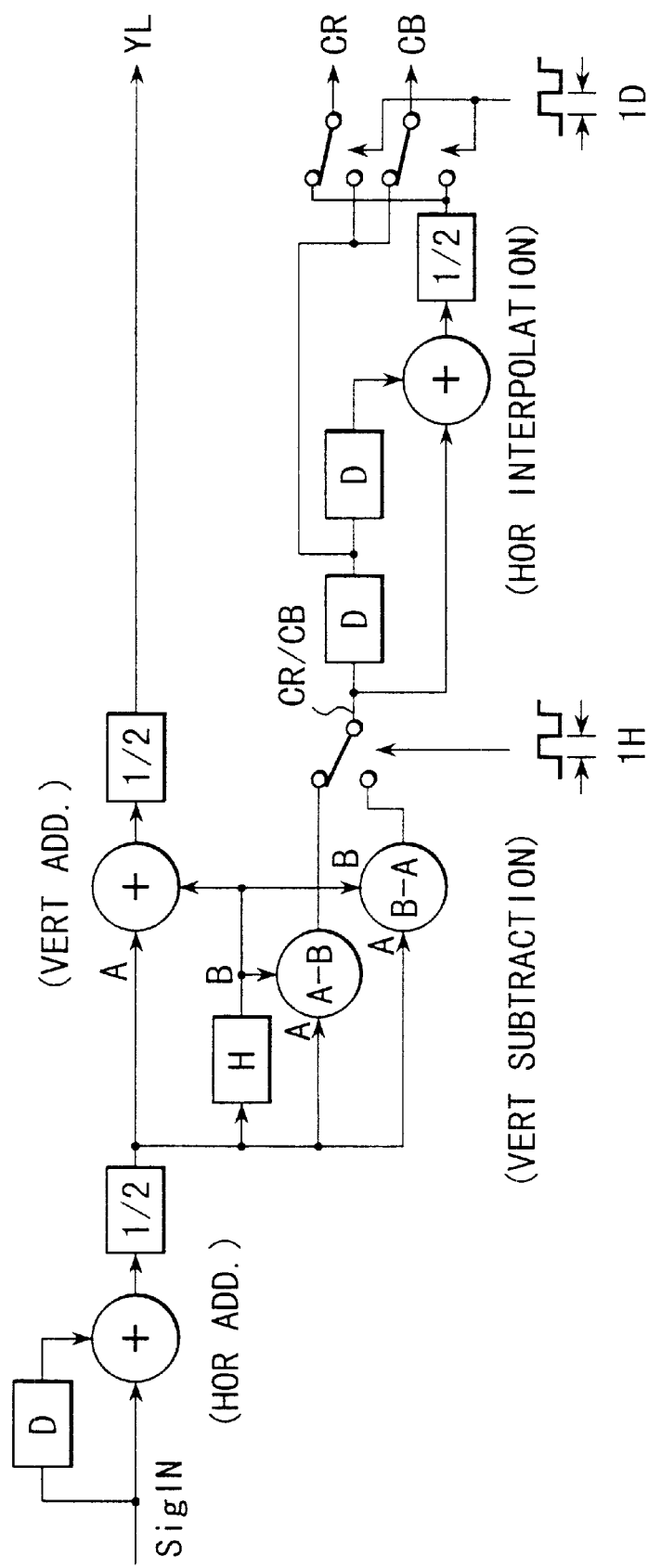
FIG. 9 is a block diagram of a digital circuit for processing signal to produce color signals as shown in FIGS. 8A, 8B, 8C.

Shown in FIG. 9 is a block diagram of a digital circuit for processing signal to produce CR, CB, YL signals using the complementary color filter array of this embodiment, the operation of which will be described below with reference to FIGS. 8A, 8B, 8C. It should be noted that this digital signal processing circuit is located inside the processing circuit 7 in FIG. 7. To obtain CR, CB, YL signals in the full-pixel readout mode, a horizontal addition is first performed by adding together and averaging an input signal SigIN and a signal obtained by delaying the input signal SigIN by 1D (data). In other words, a horizontal addition is sequentially performed in the manner of (first pixel+second pixel), (second pixel+third pixel), etc. To produce YL signal, a vertically added signal is obtained by adding together and averaging signal A resulting from the above horizontal addition and signal B obtained by delaying the signal A by 1H (line). This becomes YL signal. To produce CR signal and CB signal, signal (A−B) derived from subtraction from the horizontally added signal A of signal B obtained by delaying signal A by 1H line, and signal (B−A) derived from the inverted subtraction thereof are alternately selected for each 1D. Thus obtained signal is CR/CB signal. The CR/CB signal becomes CR signal for the odd-number data in the horizontal direction and CB signal for the even-number data in the horizontal direction. Accordingly, a signal obtained by adding together and averaging (horizontally interpolating) CR/CB signal and one derived from 2D-delay of CR/CB signal, and a signal obtained by 1-D delay of CR/CB signal can be alternately selected for each 1D to produce CR signal (FIG. 8A) and CB signal (FIG. 8B).

A description will now be given by way of FIGS. 10A, 10B, 10C with respect to the manner of forming of CR, CB, YL signals when CCD image pickup device using the complementary color filter array constructed as shown in FIGS. 8A, 8B, 8C is driven in a skip readout mode. While four pixels in horizontal and vertical directions are treated as a set to produce CR, CB, YL signals in the full-pixel readout mode, the first pixel for CR signal in the skip readout mode is produced only by pixels in the horizontal direction as (Ye11+Mg12)−(Cy13+G10). It should be noted that G10 represents a complementary color filter adjacent on the left side to the complementary color filter Ye11 which is located at the upper-left end in the complementary color filter array shown in FIG. 10A. The second pixel is similarly produced as (Ye11+Mg12)−(Cy13+G14), and the third pixel, too, is similarly produced only by pixels in the horizontal direction. CR signals of the lines of third and after can be produced in a similar manner as the above.

In respect of CB signal, it is possible to produce the first pixel by pixels in horizontal direction as (Cy13+Mg12)−(Ye11+G10). CB signals of the pixels of second and after and of the lines of third and after can be similarly obtained. Further, for YL signal, the first pixel is produced by pixels in horizontal direction as (Ye11+Mg12)+(Cy13+G10), and YL signals can be similarly produced with respect to pixels of second and after and for other lines. Since, in this manner, color signals can be produced without an exception for each pixel of every line, it is possible to produce color signals no matter how skipped when read out.

Figure 11:
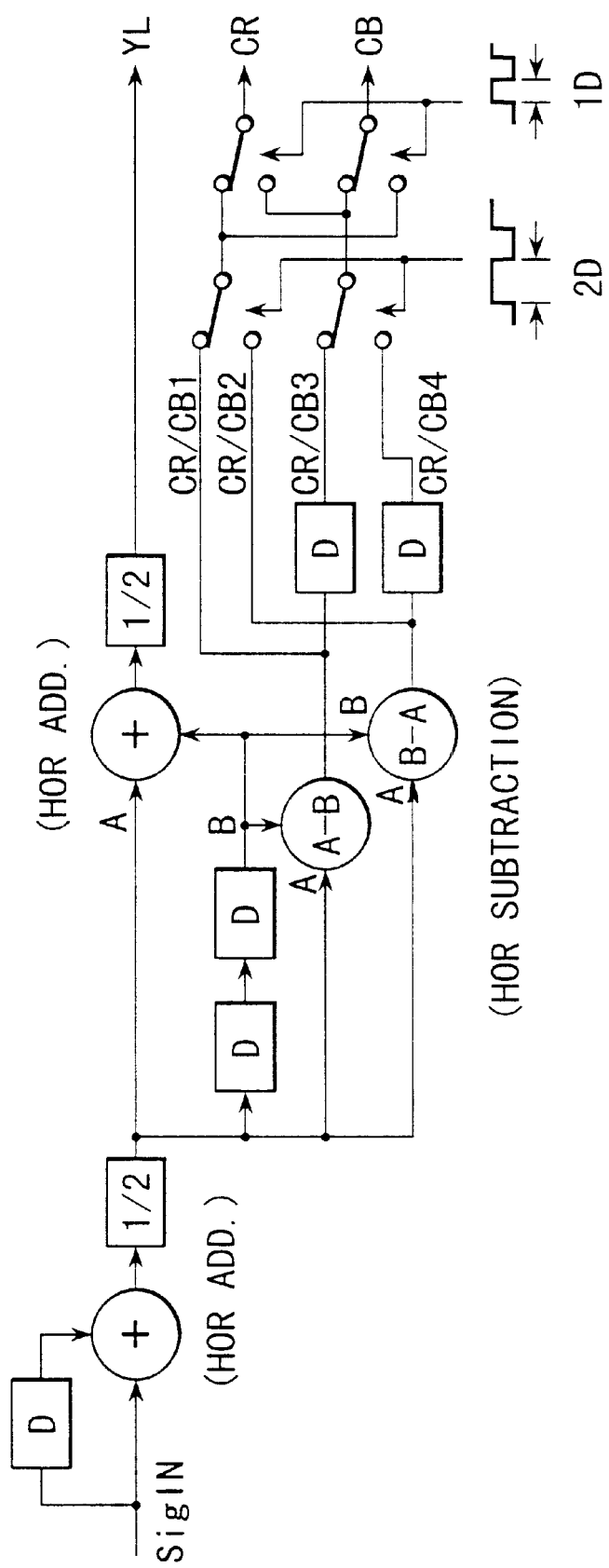
FIG. 11 is a block diagram of a digital circuit for processing signal to produce color signals as shown in FIGS. 10A, 10B, 10C.

Shown in FIG. 11 is a block diagram of a digital circuit for processing signal to produce CR, CB, YL signals by means of the complementary color filter array in this skip readout mode, the operation of which will be described below with reference to FIGS. 10A, 10B, 10C. First, a horizontal addition is performed by adding together and averaging an input signal SigIN and a signal obtained by delaying the input signal SigIN by 1D (data). In other words, a horizontal addition is sequentially performed in the manner of (first pixel+second pixel), (second pixel+third pixel), etc. To produce YL signal, a horizontally added signal is obtained by adding together and averaging the above horizontally added signal A and signal B obtained by 2D-delay of signal A. This becomes YL signal.

Next to produce CR signal and CB signal: signal (A−B) obtained by subtraction from the horizontally added signal A of signal B derived from a further delay of 2D of signal A is determined as CR/CB1 signal; signal (B−A) derived from the inverted subtraction thereof is determined as CR/CB2 signal; a signal obtained by delaying the CR/CB1 signal by 1D is determined as CR/CB3 signal; and a signal obtained by delaying CR/CB2 signal by 1D is determined as CR/CB4 signal. These CR/CB1, CR/CB2, CR/CB3 and CR/CB4 signals can be alternately selected for each 1D in periods of 2D to produce CR signal (FIG. 10A) and CB signal (FIG. 10B).

Figure 12A:
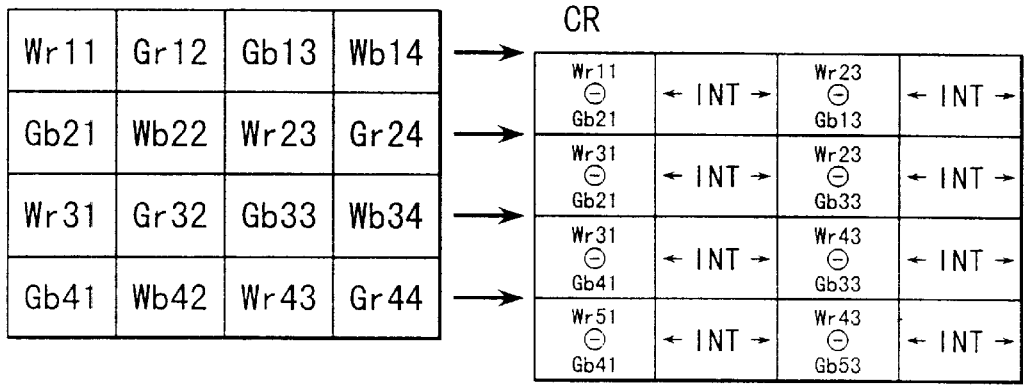
FIGS. 12A, 12B, 12C show a second embodiment of color filter array and the manner of signal processing for producing color signals in a full-pixel readout mode.
Figure 12B:
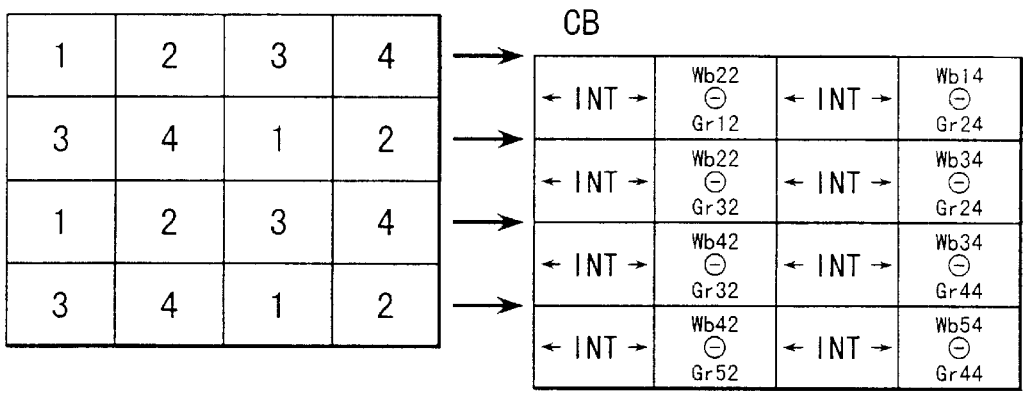
Figure 12C:
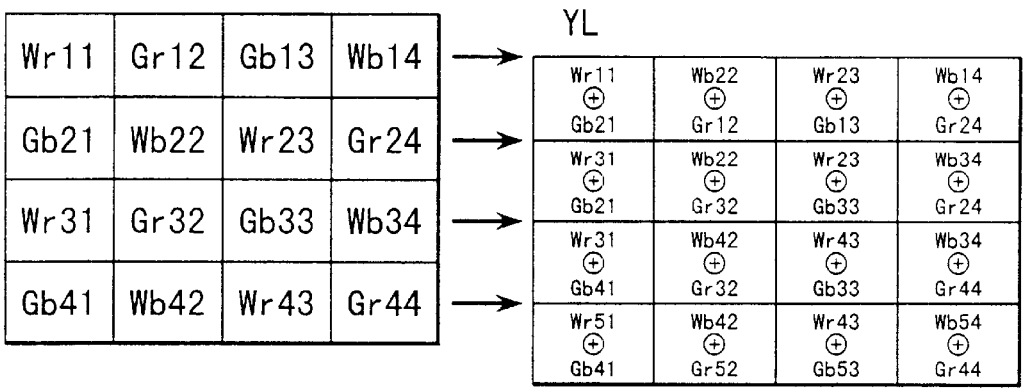

A second embodiment of the color filter array will now be described with reference to FIGS. 12A, 12B, 12C. This embodiment corresponds to the fourth to sixth aspects of the invention where the present invention is applied to a color filter array consisting of mixed complementary color filters. Shown on the right side of FIGS. 12A, 12B, 12C is the manner of signal processing for producing color signals (CR, CB, YL) when CCD image pickup device is driven in a full-pixel readout mode using this mixed complementary color filter array. When Wr, Gr, Gb and Wb are represented by numerals 1, 2, 3 and 4 respectively, the mixed complementary color filter array is arranged as shown in FIG. 12B, resulting in a filter arrangement like that obtained by a 90-degree turn of the known mixed complementary color filter array shown in FIG. 3B.

A description will now be given with respect to production of the signals of CR, CB, YL when driven in the full-pixel readout mode using this mixed complementary color filter array. Similarly to the known example, these color signals are obtained as CR signal from (Wr−Gb), CB signal from (Wb−Gr) and YL signal from (Wr+Gb) or (Wb+Gr). However, while the output in the known example is provided for each one line (row) in such a manner as CR, CB, CR, CB, the present embodiment is constructed so that CR, CB signal is outputted for each column. All pixels can be read out without specifically degrading the resolution. Further, since CR, CB, YL signals can be obtained for each single line, color signals can be generated even in a skip readout mode.

In respect of CR signals of this embodiment, as shown in FIG. 12A, the CR signals of the first vertical column are produced based on the signals from the first vertical pixel column and the CR signals of the third vertical column are produced based on the signals of the third vertical pixel column. CR signals of the second vertical column and fourth vertical column are to be obtained by a right-and-left (horizontal) interpolation. Here a 180-degree difference in phase occurs between the CR signals of the first vertical column and the CR signals of the third vertical column. Further in respect of CB signals, as shown in FIG. 12B, the CB signals of the second vertical column are produced based on signals of the second vertical pixel column, and the CB signals of the fourth vertical column are produced based on signals of the fourth vertical pixel column. CB signals of the first and third vertical column are derived from a left-and-right interpolation. Here a 180-degree difference in phase occurs between the CB signals of the second vertical column and the CB signals of the fourth vertical column.

Figure 13:
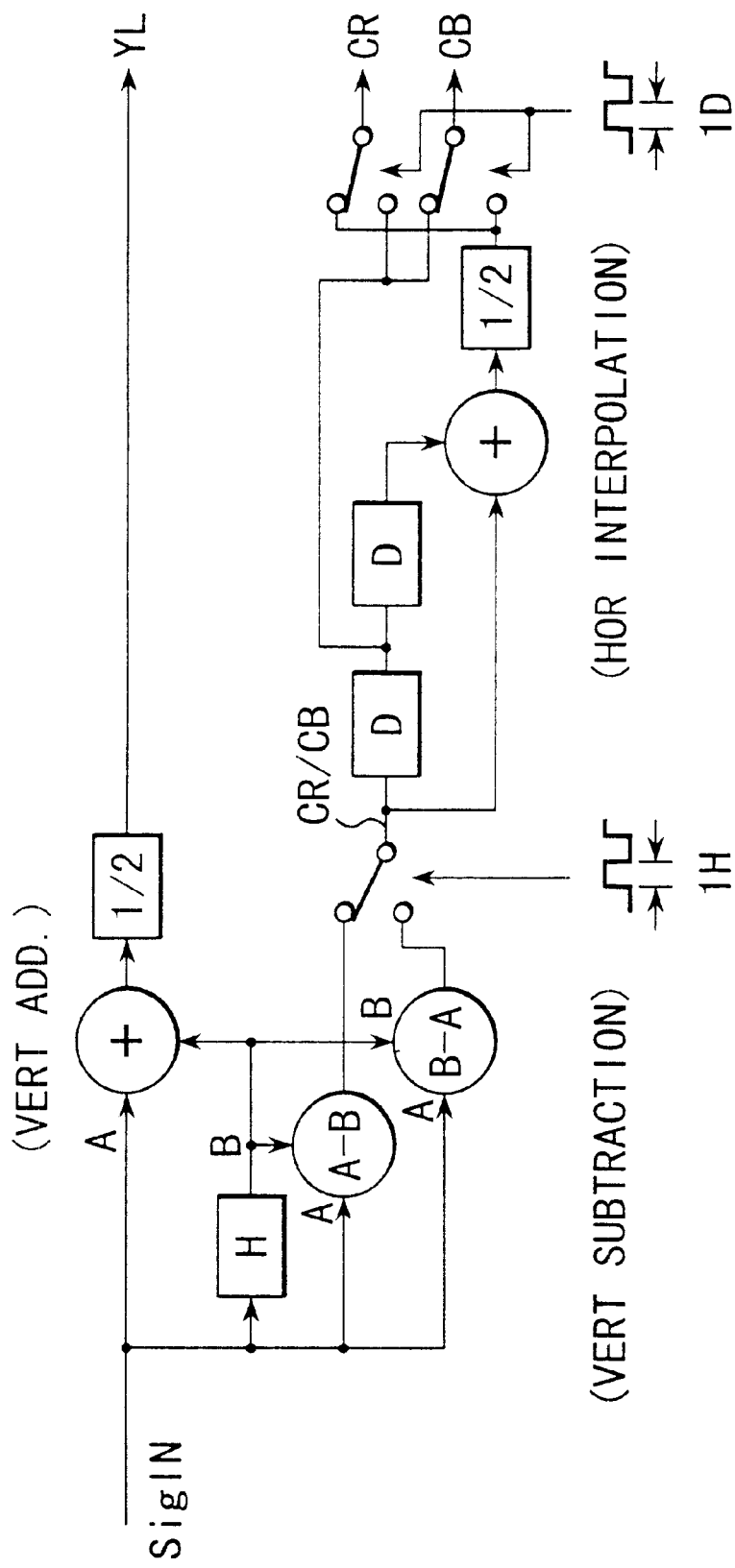
FIG. 13 is a block diagram of a digital circuit for processing signal to produce color signals as shown in FIGS. 12A, 12B, 12C.

Shown in FIG. 13 is a block diagram of a digital circuit for processing signal to produce CR, CB, YL signals using the mixed complementary color filter array of this embodiment, the operation of which will be described below with reference to FIGS. 12A, 12B, 12C. To obtain CR, CB, YL signals in the full-pixel readout mode, an input signal (SigIN)A and signal B obtained by delaying the input signal A by 1H (line) are first added together and their average is found to obtain a vertically added signal. This becomes YL signal. To produce CR signal and CB signal, signal (A−B) derived from subtraction from the input signal A of signal B obtained by delaying signal A by 1H, and signal (B–A) derived from the inverted subtraction thereof are alternately selected for each 1D. Thus obtained signal is CR/CB signal. The CR/CB becomes CR signal for the odd-number data in the horizontal direction and CB signal for the even-number data in the horizontal direction. Accordingly, a signal obtained by adding together and averaging (horizontally interpolating) CR/CB signal and one derived from 2D-delay of CR/CB signal, and a signal obtained by delaying CR/CB signal by 1D can be alternately selected for each 1D to produce CR signal (FIG. 12A) and CB signal (FIG. 12B).

Figure 14A:
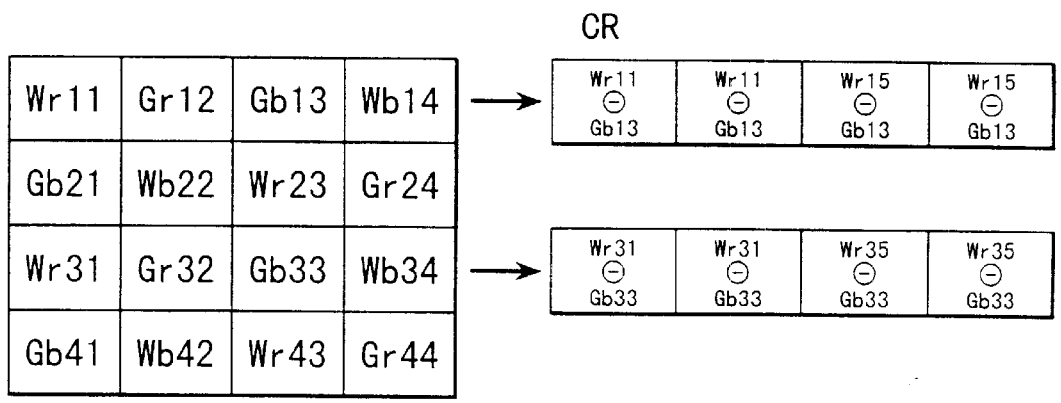
FIGS. 14A, 14B, 14C show the manner of signal processing for producing color signals in a skip readout mode in the second embodiment of color filter array as shown in FIGS. 12A, 12B, 12C.
Figure 14B:
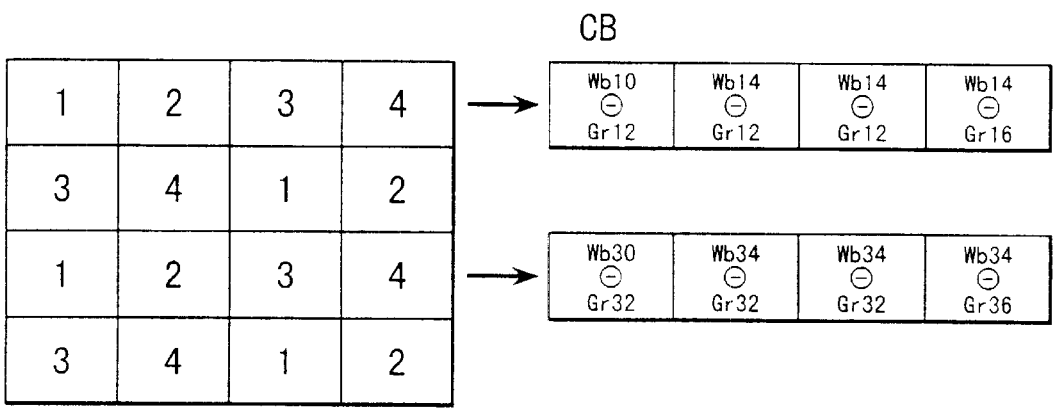
Figure 14C:
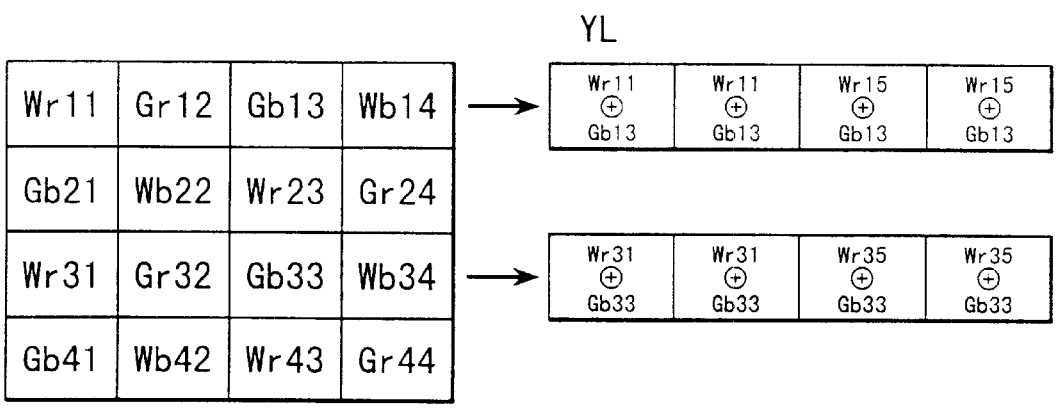

A description will now be given by way of FIGS. 14A, 14B, 14C with respect to the manner of forming of CR, CB, YL signals when CCD image pickup device using the mixed complementary color filter array constructed as shown in FIGS. 12A, 12B, 12C is driven in a skip readout mode. While only CR signal can be extracted when the first line and third line, for example, are read out in the skip readout mode using the known mixed complementary color filter array shown in FIGS. 3A, 3B, 3C, it is possible with the present embodiment to extract the signals of CR, CB, YL at the first line and at the third line, respectively. In particular, CR signal is obtained as (Wr11–Gb13) for the first pixel of the first line, (Wr11–Gb13) for the second pixel, and similarly for third and fourth pixels, making it possible to produce CR signals for the first line. CR signal can be similarly produced also for the third line. In respect of CB signal, it is possible to extract CB signal of the first pixel by extracting (Wb10–Gr12) at the first line. For the second pixel, too, CB signal can be extracted similarly by (Wb14–Gr12). It should be noted that Wb10 represents a mixed complementary color filter adjacent on the left side to the mixed complementary color filter Wr11 which is located at the upper-left end in the mixed complementary color filter array shown in FIG. 14A. It can be extracted similarly for the third and fourth pixels, and CB signal can be extracted for the third line. In respect of YL signal, the first pixel of the first line, for example, can be extracted by (Wr11+Gb13), and YL signals of other pixels and lines can be similarly extracted. As the above, all of the signals CR, CB, YL can be extracted even when only the first or third line is read out. Thereby color signals can be generated in any kind of skip readout mode.

Figure 15:
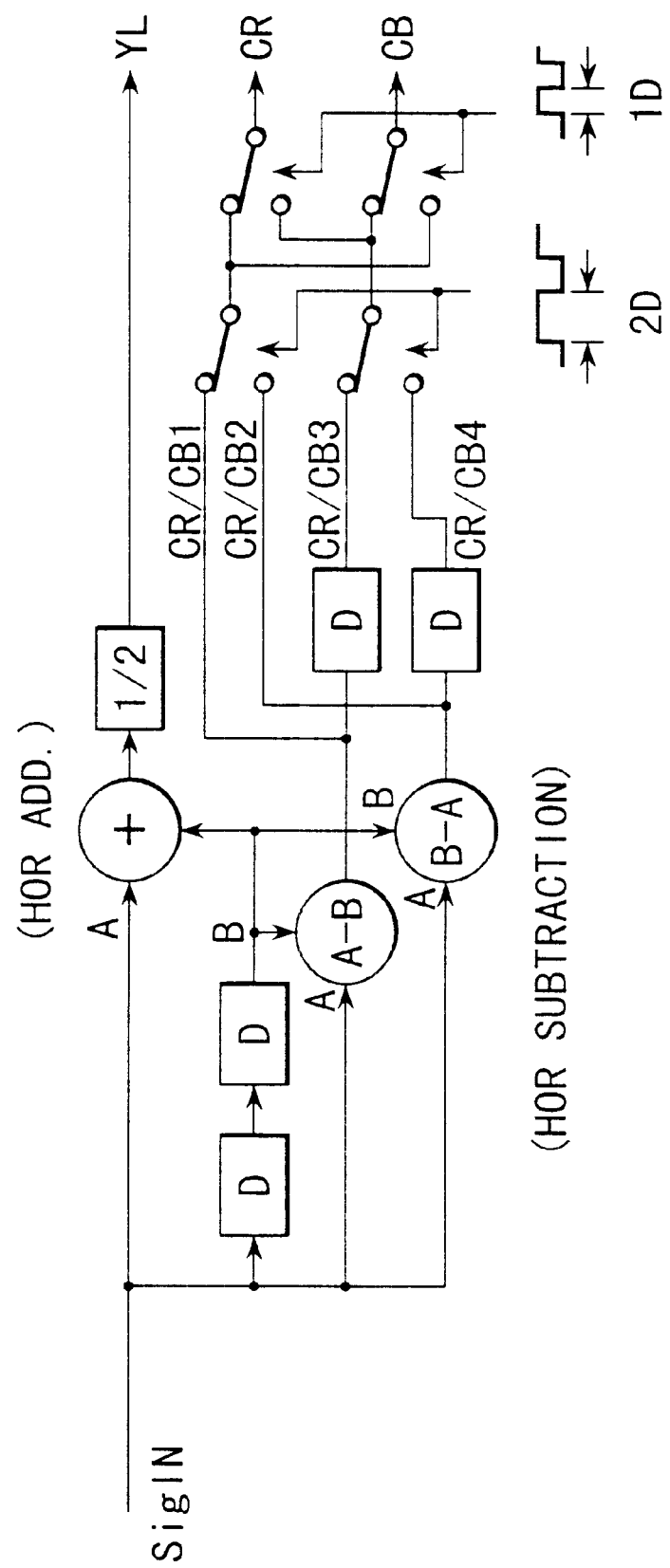
FIG. 15 is a block diagram of a digital circuit for processing signal to produce color signals as shown in FIGS. 14A, 14B, 14C.

Shown in FIG. 15 is a block diagram of a digital circuit for processing signal to produce CR, CB, YL signals by means of the mixed complementary color filter array at the time of this skip readout mode, the operation of which will be described below with reference to FIGS. 14A, 14B, 14C. First, input signal (SigIN)A and signal B obtained by further delaying the signal A by 2D are added together and averaged to obtain a horizontally added signal. This becomes YL signal. Next to produce CR, CB signals: signal (A–B) derived from subtraction from the input signal A of signal B obtained by a further delay of 2D of signal A is determined as CR/CB1 signal; signal (B–A) derived from the inverted subtraction thereof is determined as CR/CB2 signal; a signal obtained by delaying the CR/CB1 signal by 1D is determined as CR/CB3 signal; and a signal obtained by delaying CR/CB2 signal by 1D is determined as CR/CB4 signal. These CR/CB1, CR/CB2, CR/CB3 and CR/CB4 signals can be alternately selected for each 1D in periods of 2D to produce CR signal (FIG. 14A) and CB signal (FIG. 14B).

Figure 16A:
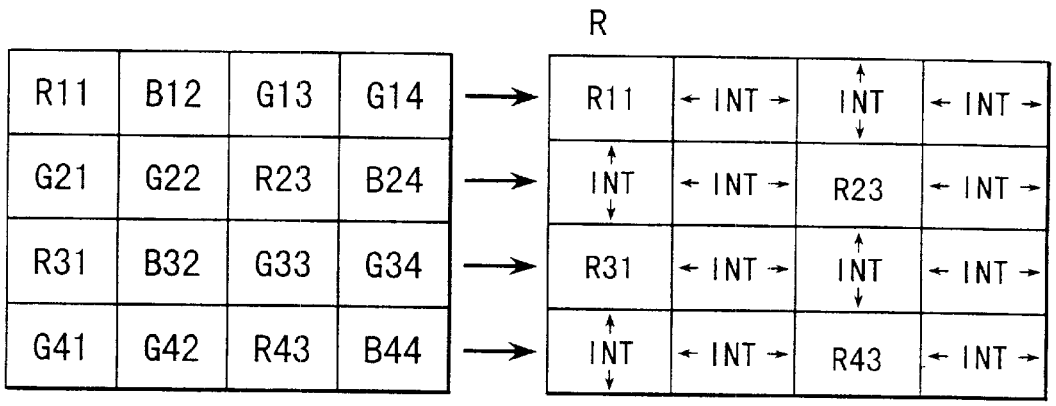
FIGS. 16A, 16B, 16C show a third embodiment of color filter array and the manner of signal processing for producing color signals in a full-pixel readout mode.
Figure 16B:
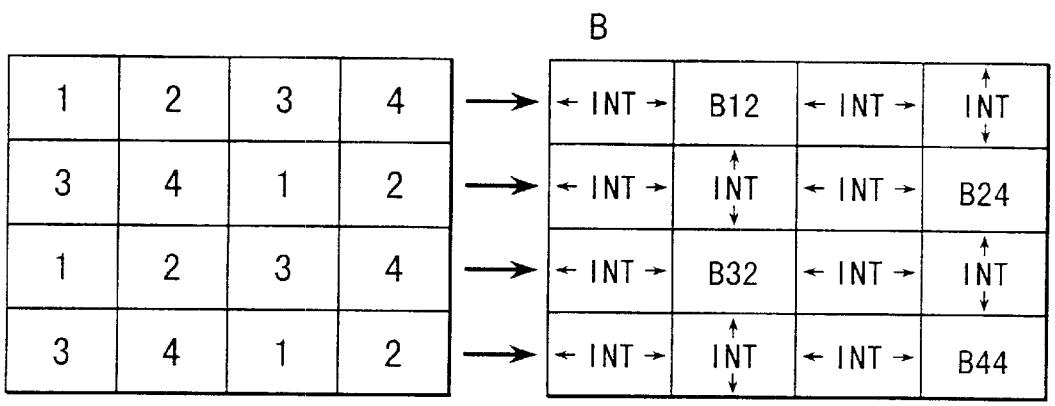
Figure 16C:
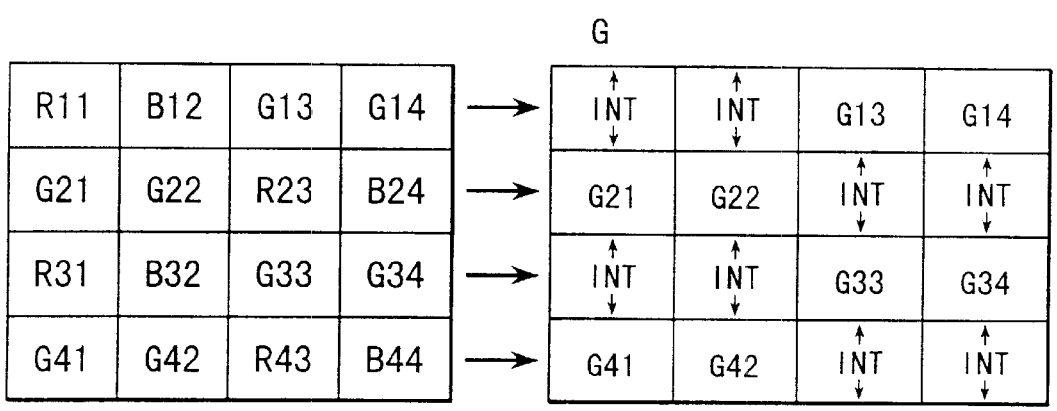

A third embodiment of the color filter array will now be described with reference to FIGS. 16A, 16B, 16C. This embodiment corresponds to the seventh and eighth aspects of the invention where the present invention is applied to a color filter array consisting of primary color filters. Shown on the right side of FIGS. 16A, 16B, 16C is the manner of signal processing for producing color signals (R, G, B) when CCD image pickup device is driven in a full-pixel readout mode using this primary color filter array. When Wr is represented by "1", B by "2", and G by "3, 4", the primary color filter array is arranged as shown in FIG. 16. It has a similar order of arrangement as the color filter array of the first embodiment shown in FIG. 8B or of the second embodiment shown in FIG. 12B. As shown in FIGS. 16A, 16B, 16C, this primary color filter array is arranged as having the color filter rows of respective adjacent lines that are horizontally shifted by 2-pixel pitch from each other.

Figure 5A:
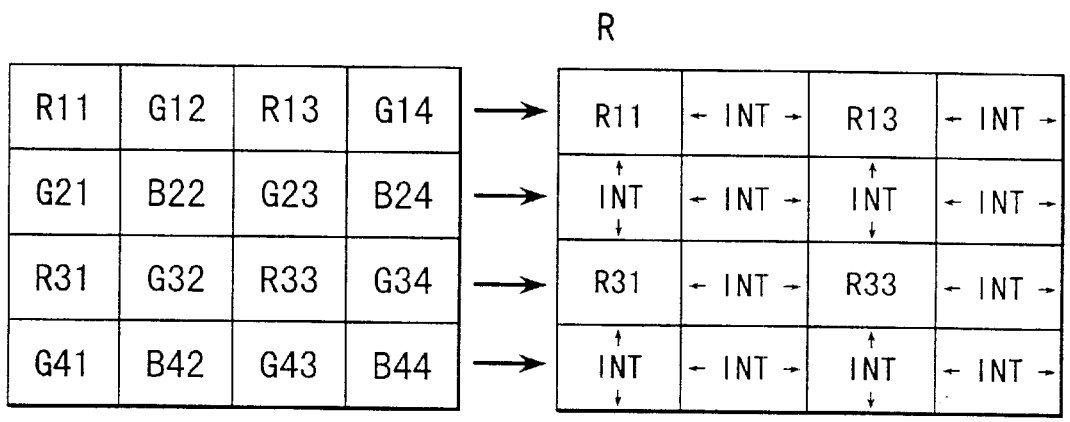
FIGS. 5A, 5B, 5C show the structure of a known primary color filter array and the manner of signal processing for producing color signals in a full-pixel readout mode using such filter array.
Figure 5B:
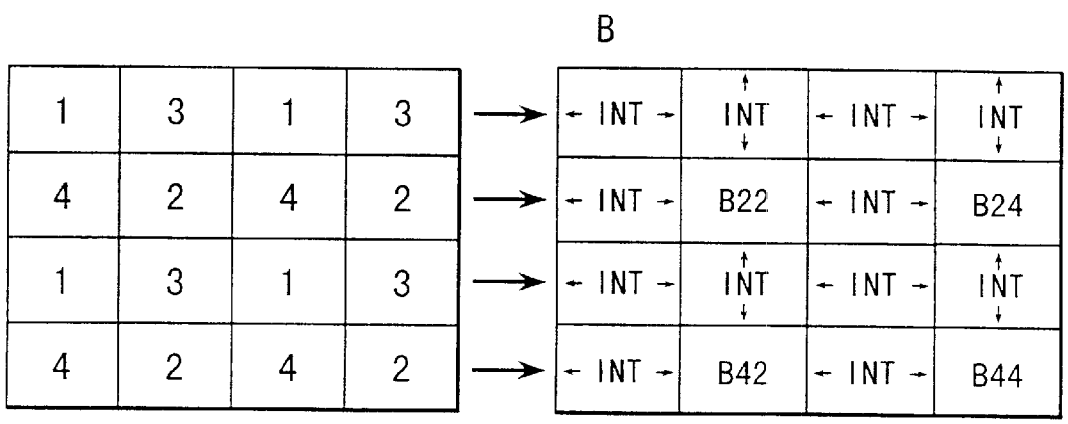
Figure 5C:
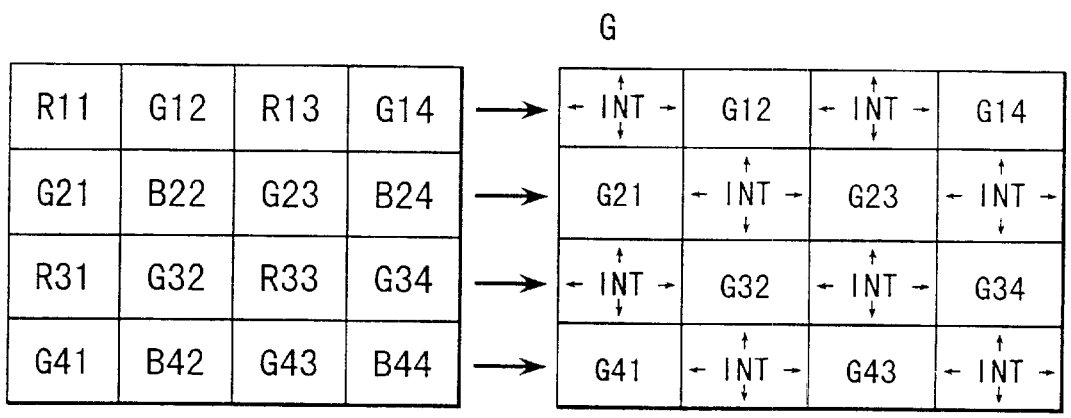
Figure 6:
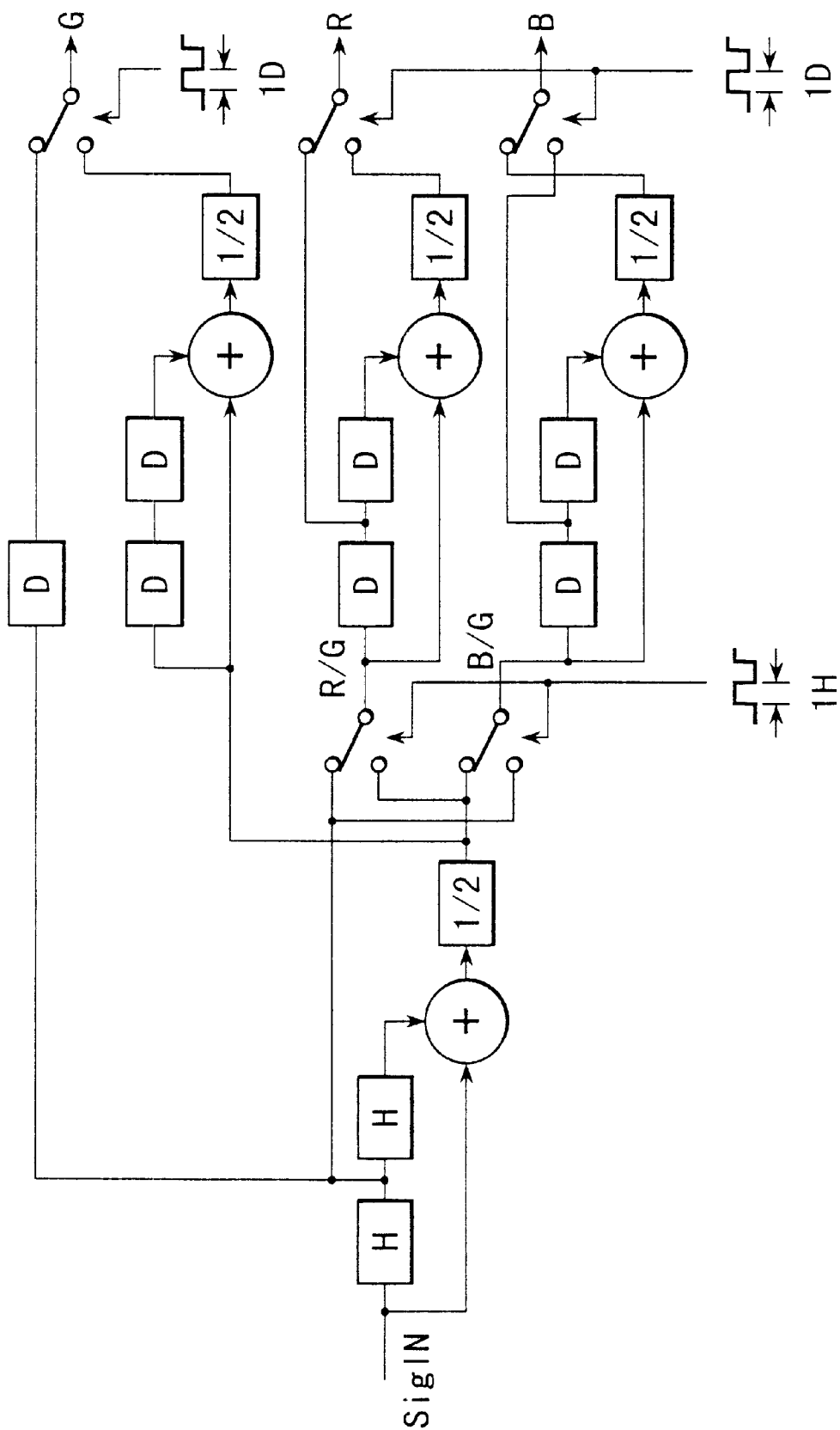
FIG. 6 is a block diagram of a digital circuit for processing signal to produce color signals as shown in FIGS. 5A, 5B, 5C.

A description will now be given with respect to production of the signals of R, G, B, in the case of using this primary color filter array. First, when R signal is to be produced, it is possible to produce R signal by performing interpolation in directions of up and down and right and left based on R11, R31, R23, R43 as shown in FIG. 16A. In respect of B signal, too, interpolation is similarly performed in directions of up and down and left and right as shown in FIG. 16B. Further, G signal can be produced by interpolation in up and down direction as shown in FIG. 16C. Accordingly, all pixels can be read out without degrading resolution when compared to the case of using a primary color filter array of the known arrangement shown in FIGS. 5A, 5B, 5C.

Figure 17:
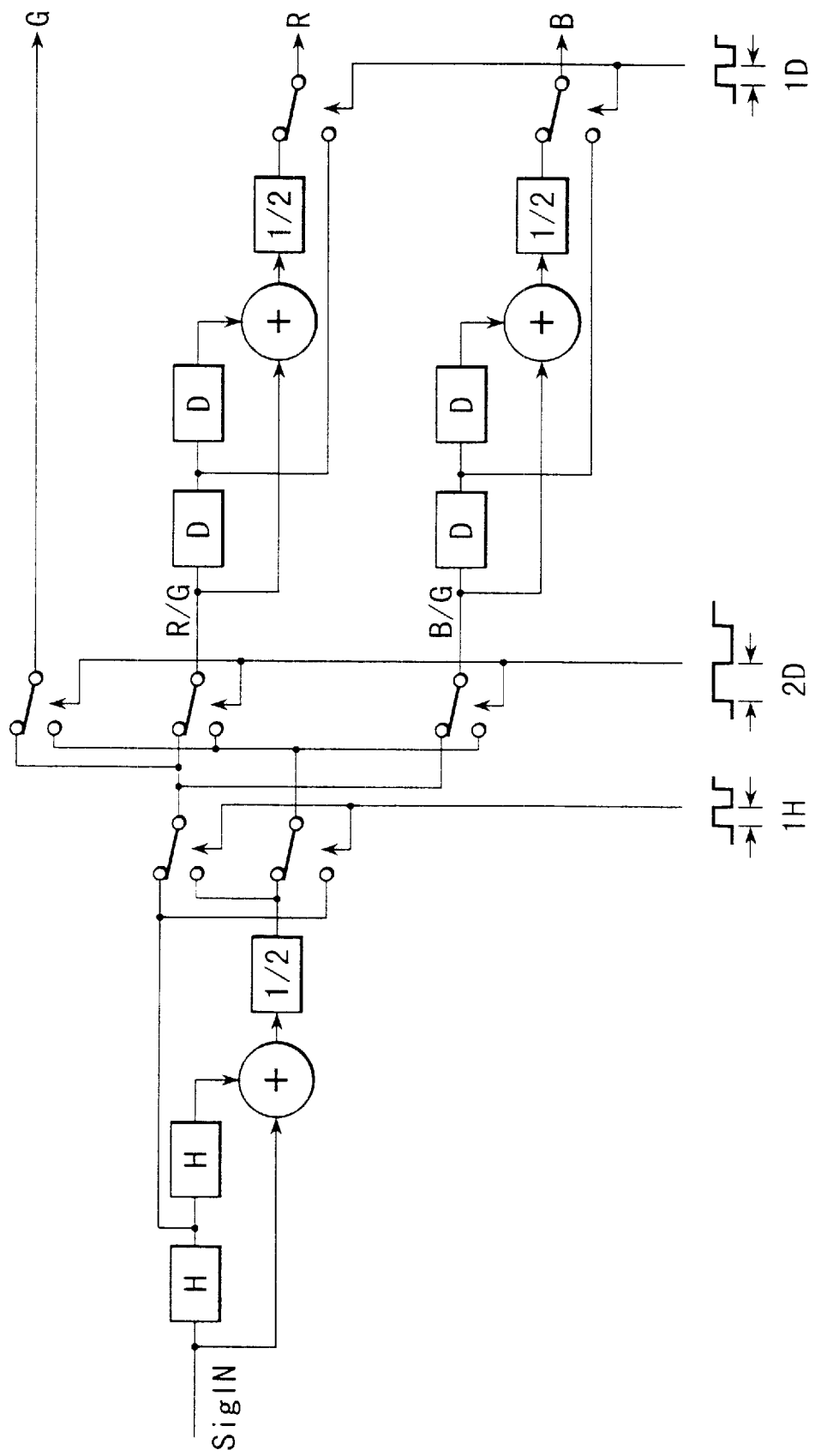
FIG. 17 is a block diagram of a digital circuit for processing signal to produce color signals as shown in FIGS. 16A, 16B, 16C.

Shown in FIG. 17 is a block diagram of the digital circuit for processing R, G, B signals using the primary color filter array of this embodiment, the operation of which will be described below with respect to FIGS. 16A, 16B, 16C. First, to produce R signal and B signal, an interpolation between lines in up and down direction is possible by selecting for each 1H from a signal obtained by adding together and averaging input signal SigIN and a signal derived from 2H-delay of input signal SigIN and a signal obtained by delaying input signal SigIN by 1H. Such selection is furthermore effected for every 2D (data) to obtain R/G, B/G signals. A signal obtained by adding together and averaging R/G signal and a signal derived from 2D-delay of R/G signal, and a signal obtained by delaying R/G signal by 1D are alternately selected for each 1D to produce R signal [FIG. 16A]. Similarly, a signal obtained by adding together and averaging B/G signal and signal derived from 2D-delay of B/G signal, and a signal obtained by delaying B/G signal by 1D are alternately selected for each 1D to produce B signal [FIG. 16B].

Next, to produce G signal, an interpolation between lines in up and down direction is possible by alternately selecting for each 1H from a signal obtained by adding together and averaging input signal SigIN and a signal derived from 2H-delay of input signal SigIN, and a signal obtained by delaying input signal SigIN by 1H. Furthermore, these are alternately selected for every 2D to produce G signal [FIG. 16C].

A description will now be given by way of FIGS. 18A, 18B, 18C with respect to the manner of forming of R, G, B signals when CCD image pickup device using the primary color filter array constructed as shown in FIGS. 16A, 16B, 16C is driven in a skip readout mode. When the first line and third line for example are to be read out in the skip readout mode in the case where the known primary color filter array shown in FIGS. 5A, 5B, 5C, only R signal and G signal can be extracted for the first line and only R signal and G signal, too, for the third line. It is possible with the present embodiment, however, to extract all color signals for each single line even when driven in a skip readout mode. This will be explained below in respect of R signal in FIG. 18A.

Figure 18A:
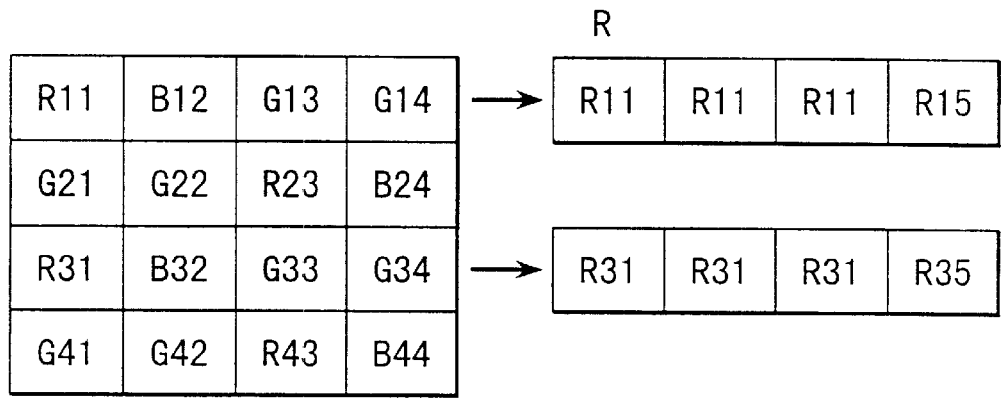
FIGS. 18A, 18B, 18C show the manner of signal processing for producing color signals in a skip readout mode in the third embodiment of color filter array as shown in FIGS. 16A, 16B, 16C.
Figure 18B:
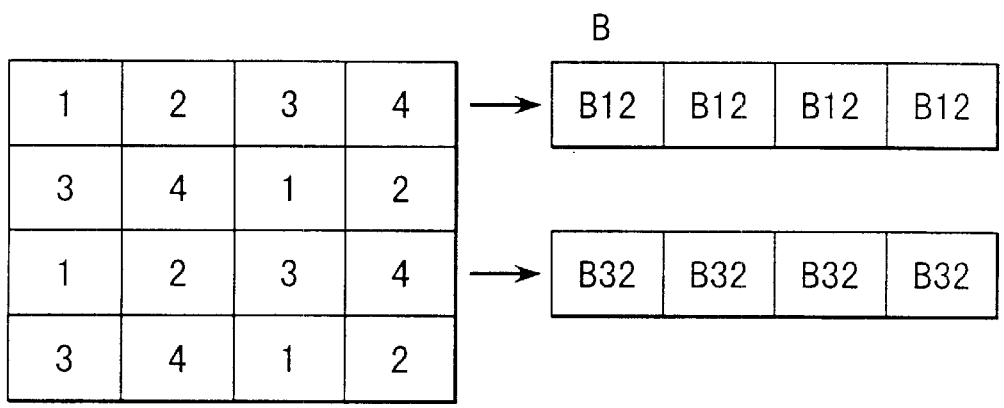
Figure 18C:
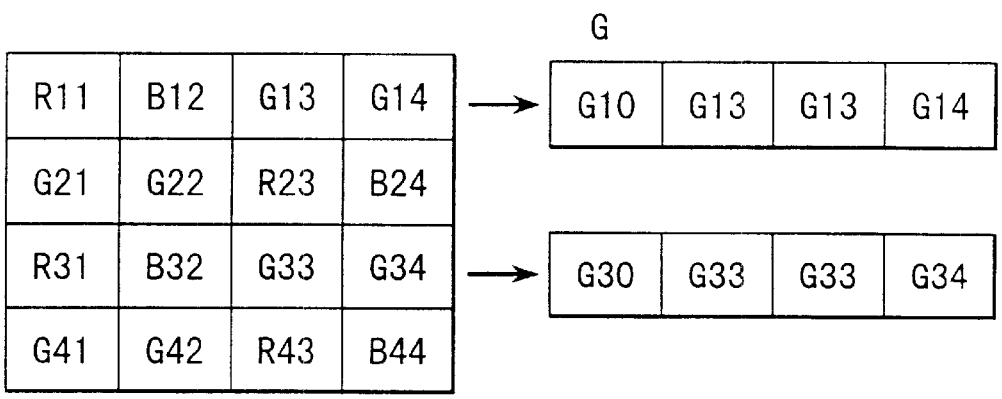

For example, R11 in its unmodified state is used for the first pixel of the first line, and it is possible to replace the second and third pixels respectively by R11 and the fourth pixel by R15 (representing the filter adjacent on the right side to the primary color filter G14 located at the upper-right end of the primary color filter array shown in FIG. 18A). While pixels in this case are replaced using R11 and R15, it is also possible that the third pixel of the first line be interpolated by (R11+R15). For the third pixel of the third line, an interpolation is also possible by (R31+R35).

In respect of B signal, too, the first pixel of the first line for example can be replaced by B12, and B12 in its unmodified form is used for the second pixel, the third pixel being replaced by B12 and the fourth pixel also by B12 to produce B signal. B signal can be similarly produced also for the third line. In respect of G signal: the first pixel of the first line for example is replaced by G10 (representing the filter adjacent on the left side to the primary color filter R11 which is located at the upper-left end in the primary color filter array shown in FIG. 18C); the second pixel is replaced by G13; G13 in its unmodified state is used for the third pixel; and G14 in its unmodified state is used for the fourth pixel, to produce G signals of the first line. In this case, too, it is also possible to interpolate the first and second pixels using (G10+G13). R signal, B signal and G signal can be outputted to each line in the above manner, and therefore color signals can be generated in any kind of skip readout.

Figure 19:
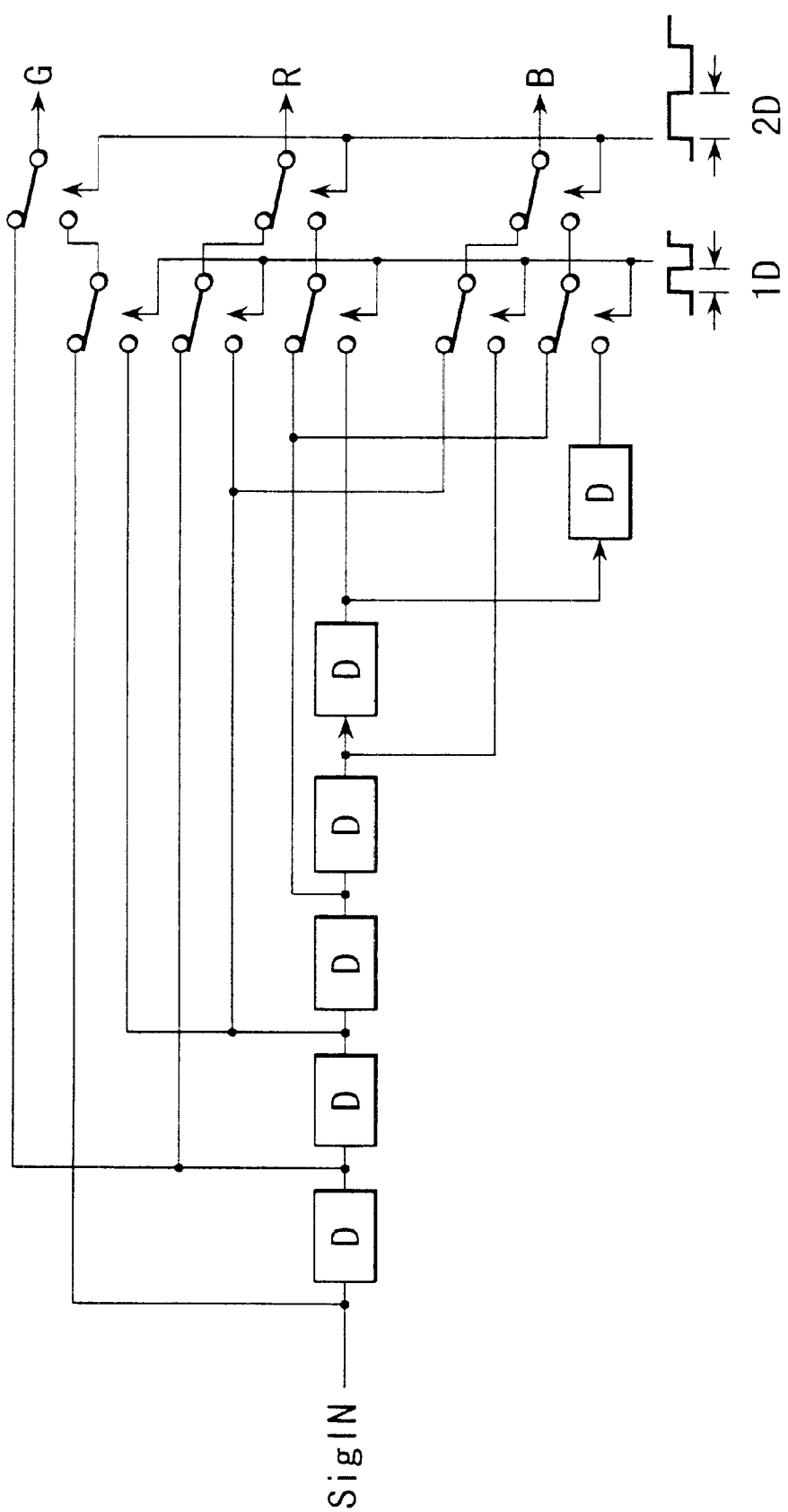
FIG. 19 is a block diagram of a digital circuit for processing signal to produce color signals as shown in FIGS. 18A, 18B, 18C.

Shown in FIG. 19 is a block diagram of a digital circuit for processing signal to produce R, G, B signals by means of the primary color filter array in the skip readout mode, the operation of which will be described below with reference to FIGS. 18A, 18B, 18C. First, to produce R signal and B signal, a signal obtained by alternately selecting for each 1D from input signal SigIN delayed by 1D and another delayed by 2D, and a signal obtained by alternately selecting for each 1D from input signal SigIN delayed by 3D and another delayed by 5D are furthermore alternately selected for every 2D to produce R signal (FIG. 18A). Further, a signal obtained by alternately selecting for each 1D from input signal SigIN delayed by 2D and another delayed by 4D, and a signal obtained by alternately selecting for each 1D from input signal SigIN delayed by 3D and another delayed by 6D are furthermore alternately selected for every 2D to produce B signal (FIG. 18B). Further, in respect of G signal (FIG. 18C), a signal obtained by alternately selecting for each 1D from input signal SigIN and signal derived from 2D-delay of input signal SigIN, and a signal obtained by delaying input signal SigIN by 1D are alternately selected for every 2D to obtain G signal.

As has been described by way of the above embodiments, it is possible in accordance with the present invention to achieve a single-plate color solid-state image pickup apparatus, in which the resolution characteristics of hue and luminance are not degraded when all the pixels of the solid-state image pickup device are read out, and color signals can be generated by a single line even when lines are skipped in readout, thereby preventing an occurrence of color deviation.

What is claimed is:

1. A single-plate color solid-state image pickup apparatus including a solid-state image pickup device having a plurality of pixels arrayed in horizontal and vertical directions and a color filter array consisting of a plurality of color filters arrayed in horizontal and vertical directions correspondingly to the respective pixels of the solid-state image pickup device, said color filter array comprising:

complementary color filters constructed by sequentially arranging color filter columns in a horizontally repeating cycle of four pixels of first, second, third, and fourth, first color-difference signals obtained as modulated signals periodically in a certain number of pixels from "first+second" and "third+fourth" pixel columns, second color-difference signals obtained as modulated signals periodically in the same pixel number as the first color-difference signals from "second+third" and "fourth+fifth" pixel columns, and the first and second color-difference signals obtained from the pixel columns of "third+fourth" and "fourth+fifth" being different respectively in phase by 180 degrees from the first and second color-difference signals obtained from the pixel columns of "first+second" and "second+third".

2. The single-plate color solid-state image pickup apparatus according to claim 1, further comprising control means for driving and controlling said solid-state image pickup device, wherein the control means has a drive function of a mode for recording a still image by extracting pixel signals of all the pixels through a sequential scan of said solid-state image pickup device, and a drive function of a mode for recording a still image or processing a dynamic image by extracting pixel signals of every n (n being an integer of 1 or greater) lines out of every m (m being an integer of 2 or greater) lines in the vertical direction from said solid-state image pickup device.

3. The single-plate color solid-state image pickup apparatus according to claim 2, wherein, in the operation of the mode for recording a still image or processing a dynamic image by extracting pixel signals of n lines out of every m lines in the vertical direction from said solid-state image pickup device, color signals are generated by each single line as a unit based on color filter row having the horizontally repeating cycle of four pixels of first, second, third, and fourth.

4. A single-plate color solid-state image pickup apparatus including a solid-state image pickup device having a plurality of pixels arrayed in horizontal and vertical directions and a color filter array consisting of a plurality of color filters arrayed in horizontal and vertical directions correspondingly to the respective pixels of the solid-state image pickup device, said color filter array comprising:

mixed complementary color filters constructed by sequentially arranging color filter columns in a horizontally repeating cycle of four pixels of first, second, third, and fourth, first color-difference signals obtained as modulated signals periodically in a certain number of pixels from first and third pixel columns, second color-difference signals obtained as modulated signals periodically in the same pixel number as the first color-difference signals from second and fourth pixel columns, and the first and second color-difference signals obtained from the pixel columns of third and fourth being different in phase by 180 degrees from the first and second color-difference signals obtained from the pixel columns of first and second.

5. The single-plate color solid-state image pickup apparatus according to claim 4, further comprising control means for driving and controlling said solid-state image pickup device, wherein the control means has a drive function of a mode for recording a still image by extracting pixel signals of all the pixels through a sequential scan of said solid-state image pickup device, and a drive function of a mode for recording a still image or processing a dynamic image by extracting pixel signals of every n (n being an integer of 1 or greater) lines out of every m (m being an integer of 2 or greater) lines in the vertical direction from said solid-state image pickup device.

6. The single-plate color solid-state image pickup apparatus according to claim 5, wherein, in the operation of the mode for recording a still image or processing a dynamic image by extracting pixel signals of n lines out of every m lines in the vertical direction from said solid-state image pickup device, color signals are generated by each single line as a unit based on color filter row having the horizontally repeating cycle of four pixels of first, second, third, and fourth.

7. A single-plate color solid-state image pickup apparatus including a solid-state image pickup device having a plurality of pixels arrayed in horizontal and vertical directions, a color filter array consisting of color filters of three kinds different one another in spectral sensitivity, arrayed in horizontal and vertical directions correspondingly to the respective pixels of the solid-state image pickup device, and control means for driving and controlling said solid-state image pickup device, the control means having a drive function of a mode for recording a still image by extracting the pixel signals of all the pixels through a sequential scan of said solid-state image pickup device and a drive function of a mode for recording a still image or processing a dynamic image by extracting pixel signals of every n (n being an integer of 1 or greater) lines out of every m (m being an integer of 2 or greater) lines in the vertical direction from the solid-state image pickup device, said color filter array comprising:

primary color filters, each color filter row being arranged in the order of first, second, third and third color filters in the horizontal direction, the color filter row of n+1'th line is shifted by 2-pixel pitch in the horizontal direction in relation to the color filter row of n'th line.

8. The single-plate color solid-state image pickup apparatus according to claim 7, wherein, in the operation of the mode for recording a still image or processing a dynamic image by extracting pixel signals of n lines out of every m lines in the vertical direction from said solid-state image pickup device, color signals are generated by each single line as a unit based on color filter row having the horizontally repeating cycle of four pixels of first, second, third and third.

* * * * *